US012652102B2

(12) United States Patent
Hu et al.

(10) Patent No.: US 12,652,102 B2
(45) Date of Patent: Jun. 9, 2026

(54) METHOD FOR TIME-DOMAIN PARAMETER DETERMINATION, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Yi Hu, Dongguan (CN); Haitao Li, Dongguan (CN); Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 338 days.

(21) Appl. No.: 18/457,322

(22) Filed: Aug. 28, 2023

(65) Prior Publication Data

US 2023/0403068 A1     Dec. 14, 2023

Related U.S. Application Data

(63) Continuation of application No. PCT/CN2021/092755, filed on May 10, 2021.

(51) Int. Cl.
*H04B 7/185* (2006.01)
(52) U.S. Cl.
CPC ................................ *H04B 7/18513* (2013.01)
(58) Field of Classification Search
CPC .......................... H04B 7/18513; H04B 7/1851; H04B 7/1853; H04W 56/0045
See application file for complete search history.

(56) References Cited

U.S. PATENT DOCUMENTS

| | | | | |
|---|---|---|---|---|
| 11,202,272 B2 * | 12/2021 | Abedini | ............ | H04W 56/0045 |
| 11,219,066 B2 * | 1/2022 | Shimomura | ...... | H04W 56/0005 |
| 11,856,631 B1 * | 12/2023 | Huang | ................ | H04W 36/249 |
| 2021/0105761 A1 * | 4/2021 | Cheng | ................... | H04L 5/0053 |
| 2022/0086780 A1 * | 3/2022 | Tsai | .................... | H04W 56/006 |
| 2022/0095258 A1 * | 3/2022 | Yeo | ................... | H04W 56/0045 |
| 2022/0124672 A1 * | 4/2022 | Xu | .................... | H04W 72/1273 |
| 2022/0191917 A1 * | 6/2022 | Fu | .......................... | H04W 72/23 |

(Continued)

FOREIGN PATENT DOCUMENTS

| | | |
|---|---|---|
| CN | 111385013 | 7/2020 |
| CN | 112153733 | 12/2020 |
| CN | 112399546 | 2/2021 |

OTHER PUBLICATIONS

"3rd Generation Partnership Project; Technical Specification Group Radio Access Network; Solutions for NR to support non-terrestrial networks (NTN) (Release 16)," 3GPP TR 38.821, Dec. 2019, v1.0.0.

(Continued)

*Primary Examiner* — Bailor C Hsu
(74) *Attorney, Agent, or Firm* — Hodgson Russ LLP

(57) ABSTRACT

A method for time-domain-parameter determination includes the following. Receive configuration information sent by a network device, and determine a time-domain parameter according to the configuration information, where the configuration information includes a time-domain-parameter reference value and at least one time-domain-parameter offset value.

17 Claims, 6 Drawing Sheets

Network device

Terminal device 801, transmit configuration information 802, determine a time-domain parameter according to the configuration information

(56) References Cited

U.S. PATENT DOCUMENTS

| | | | | |
|---|---|---|---|---|
| 2022/0330187 A1* | 10/2022 | Cheng | ................. | H04W 56/004 |
| 2024/0163823 A1* | 5/2024 | Liu | .................... | H04B 7/18513 |

OTHER PUBLICATIONS

Sony, "Calculation of timing relationship offsets," 3GPP TSG RAN WG1 #104b-e, R1-2103304, Apr. 2021.

OPPO, "NTN control procedure for physical layer," 3GPP TSG RAN WG1 #98bis, R1-1910386, Oct. 2019.

WIPO, International Search Report and Written Opinion for International Application No. PCT/CN2021/092755, Feb. 10, 2022.

"Chairs Notes," RAN1#104b-e 8.4 eom, Apr. 2021.

Zhejiang Lab, "Timing relationship enhancements for NTN," 3GPP TSG RAN WG1 #104b-e, R1-2102799, Apr. 2021.

Lenovo et al., "Discussion on NTN TA indication," 3GPP TSG RAN WG1 #102-e, R1-2005834, Aug. 2020.

Samsung, "Enhancements on UL time and frequency synchronization for NTN," 3GPP TSG RAN WG1 #104b-e, R1-2103242, Apr. 2021.

LG Electronics, "Discussions on timing relationship enhancements in NTN," 3GPP TSG RAN WG1 #104-e, R1-2100703, Jan. 2021.

EPO, Extended European Search Report for EP Application No. 21941150.1, Mar. 13, 2024.

EPO, Communication for EP Application No. 21941150.1, Jan. 15, 2025.

* cited by examiner

100

1202

1201

1203

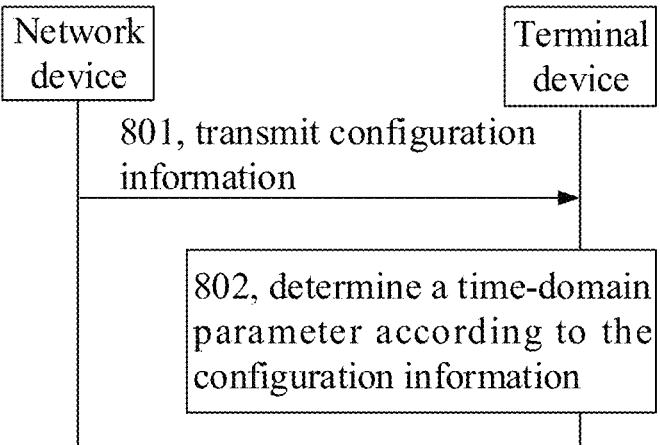
FIG. 8
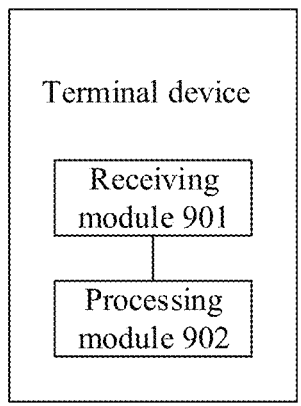
FIG. 9
FIG. 10

METHOD FOR TIME-DOMAIN PARAMETER DETERMINATION, TERMINAL DEVICE, AND NETWORK DEVICE

CROSS-REFERENCE TO RELATED APPLICATION(S)

This application is a continuation of International Application No. PCT/CN2021/092755, filed May 10, 2021, the entire disclosure of which is incorporated herein by reference.

TECHNICAL FIELD

The present disclosure relates to the field of communication technologies, and in particular, to a method for time-domain parameter determination, a terminal device, and a network device.

BACKGROUND

In a non-terrestrial network (NTN), for a scenario in which multiple satellite beams are in a cell, when a satellite is to broadcast a slot offset $K_{offset}$ or a timing advance (TA) to each terminal device, the satellite needs to broadcast one $K_{offset}$ or one TA for each satellite beam. However, because value ranges of the $K_{offset}$ and the TA are both large, configuration of each $K_{offset}$ and each TA may occupy a large number of bits. In such a configuration manner, relatively great signaling overhead may be required.

SUMMARY

Implementations of the present disclosure provide a method for time-domain parameter determination, a terminal device, and a network device.

According to a first aspect, a method for time-domain parameter determination is provided. The method includes receiving configuration information sent by a network device, and determining a time-domain parameter according to the configuration information, where the configuration information includes a time-domain-parameter reference value and at least one time-domain-parameter offset value.

According to a second aspect, a terminal device is provided. The terminal device includes a transceiver, a processor coupled to the transceiver, and a memory configured to store a computer program. The computer program is executed by the processor to cause the terminal device to perform the following. Receive configuration information sent by a network device, where the configuration information includes a time-domain-parameter reference value and at least one time-domain parameter offset value. Determine a time-domain parameter according to the configuration information.

According to a third aspect, a network device is provided. The network device includes a transceiver, a processor coupled to the transceiver, and a memory configured to store a computer program. The computer program is executed by the processor to cause the network device to perform the following. Send configuration information to a terminal device, where the configuration information is configured to determine a time-domain parameter, and the configuration information includes a time-domain-parameter reference value and at least one time-domain-parameter offset value.

BRIEF DESCRIPTION OF THE DRAWINGS

FIG. 8 is a schematic flow chart of a method for time-domain parameter determination according to implementations of the present disclosure.

FIG. 9 is a schematic structural diagram of a terminal device according to implementations of the present disclosure.

FIG. 10 is a schematic structural diagram of a network device according to implementations of the present disclosure.

DETAILED DESCRIPTION

Figure 1A:
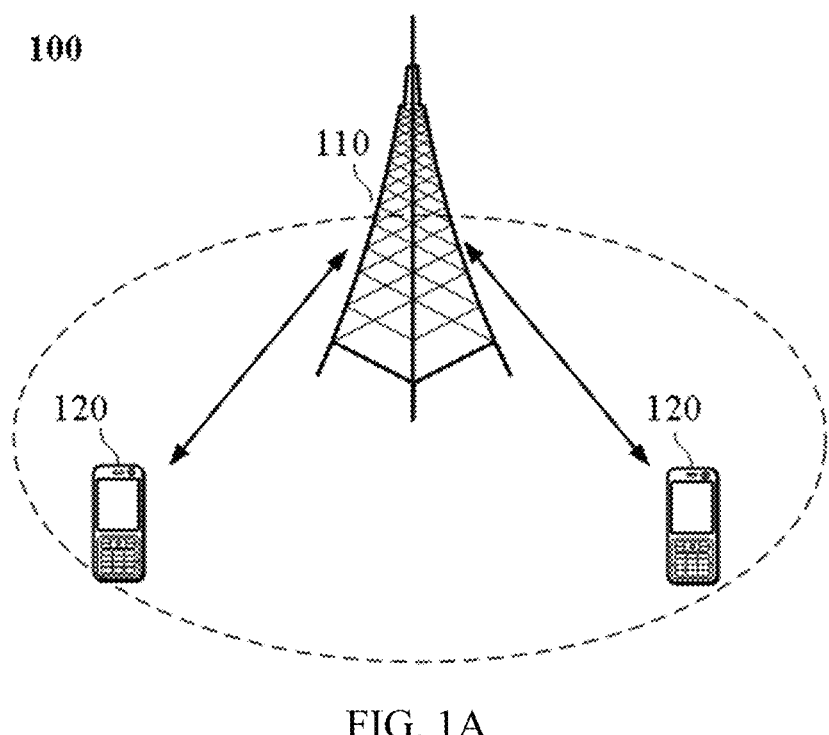
FIG. 1A is schematic architecture diagram 1 of a wireless communication system according to implementations of the present disclosure.

The following describes technical solutions in implementations of the present disclosure with reference to the accompanying drawings in the implementations of the present disclosure. Apparently, the described implementations are merely part of rather than all the implementations of the present disclosure. Based on the implementations of the present disclosure, all other implementations obtained by persons skilled in the art without creative efforts shall belong to the scope of protection of the present disclosure.

In the implementations of the present disclosure, words such as "exemplary" or "for example" are used for examples, illustration, or description. Any embodiment, implementation, or design described as "exemplary" or "for example" in the implementations of the disclosure should not be construed as preferred or advantageous over other embodiments, implementations, or designs. Rather, use of words such as "exemplary" or "for example" is intended to present related concepts in a concrete manner.

I. Non-Terrestrial Network (NTN)-Related Background

In the related art, NTN technology is studied in the 3rd generation partnership project (3GPP). In the NTN technology, satellite communication is generally used to provide communication services for ground users. Compared with terrestrial cellular network communication, satellite communication has the following advantages.

First of all, satellite communication is not limited by user location. For example, conventional land-based communication cannot cover regions where it is difficult to deploy communication infrastructures, such as sea, mountains, desert, and the like, or cannot cover regions where no communication coverage is deployed due to population scarce. For satellite communication, a satellite may cover a relatively large area of the ground, and in addition, the satellite may make orbital motion around the earth, and thus, in theory, satellite communication can cover every corner on the earth.

Secondly, satellite communication has a significant social value. Remote mountainous regions, underdeveloped countries or regions can be covered by satellite communication at a relatively low cost, so that people in these regions can enjoy advanced voice communication and mobile internet technologies, which is beneficial to reduce digital divide between the underdeveloped regions and the developed regions and promote the development of the underdeveloped regions.

Further, satellite communication can cover a long communication distance, and as the communication distance increases, communication cost does not significantly increase. Finally, satellite communication has a high stability, and is not limited by natural disasters.

Communication satellites may be classified, based on an orbital height, into a low-earth orbit (LEO) satellite, a medium-earth orbit (MEO) satellite, a geostationary earth orbit (GEO) satellite, a high elliptical orbit (HEO) satellite, and the like. At the current stage, the primary focus of research is on the LEO and the GEO.

1. LEO

The height of the LEO satellite ranges from 500 kilometer (km) to 1500 km, and has a corresponding orbital period ranging from 1.5 hours to 2 hours. Generally, a signal propagation delay of single-hop communication between a user equipment (UE) and a satellite is less than 20 milliseconds (ms). The maximum visual time of the satellite is 20 minutes. The signal propagation distance is short, the link loss is small, and the requirement for transmission power of the UE is not high.

2. GEO

The orbital height of the GEO satellite is 35786 km, and a rotation period of the GEO satellite around the earth is 24 hours. A signal propagation delay of single-hop communication between a UE and the satellite is generally 250 ms.

In order to ensure coverage of a satellite and improve the system capacity of the whole satellite communication system, generally, the satellite covers the ground with multiple beams, and one satellite can cover the ground with dozens or even hundreds of beams. One satellite beam may have a beam foot print diameter ranging from dozens of kilometers to hundreds of kilometers.

Exemplarily, FIG. 1A is a schematic architecture diagram of a communication system according to implementations of the present disclosure. As illustrated in FIG. 1A, a communication system 100 may include a network device 110, and the network device 110 can communicate with a terminal device 120 (or referred to as a communication terminal or a terminal). The network device 110 may provide communication coverage for a particular geographical region, and may communicate with terminal devices located within the coverage area.

FIG. 1A exemplarily illustrates one network device and two terminal devices. Optionally, the communication system 100 may include multiple network devices, and in coverage of each network device, other numbers of terminal devices may be included, which is not limited in the implementations of the present disclosure.

Figure 1B:
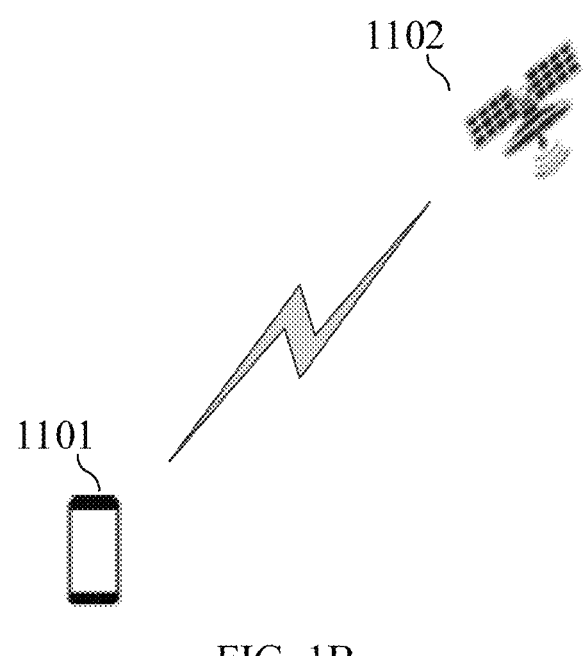
FIG. 1B is schematic structural diagram 2 of a wireless communication system according to implementations of the present disclosure.

Exemplarily, FIG. 1B is another schematic architecture diagram of a communication system according to implementations of the present disclosure. Referring to FIG. 1B, the communication system includes a terminal device 1101 and a satellite 1102, and wireless communication may be performed between the terminal device 1101 and the satellite 1102. A network between the terminal device 1101 and the satellite 1102 may also be referred to as an NTN. In the architecture of the communication system illustrated in FIG. 1B, the satellite 1102 may have a base-station function, and communication may be directly performed between the terminal device 1101 and the satellite 1102. In the system architecture, the satellite 1102 may be referred to as a network device. Optionally, the communication system may include multiple network devices 1102, and in coverage of each network device 1102, other numbers of terminal devices may be included, which is not limited in the implementations of the present disclosure.

Figure 1C:
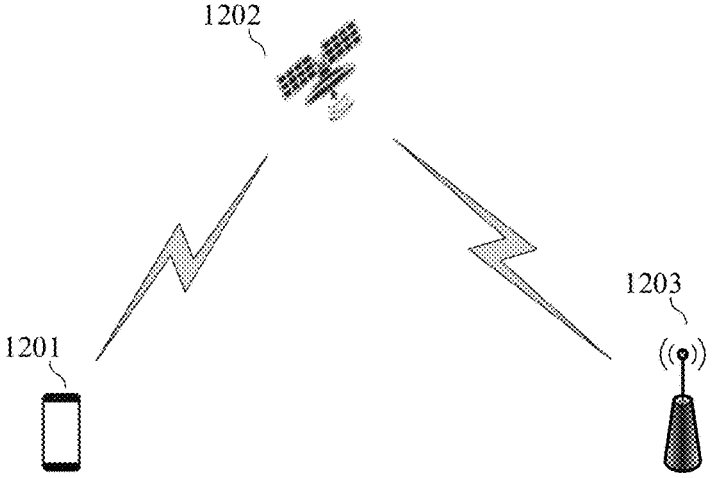
FIG. 1C is schematic architecture diagram 3 of a wireless communication system according to implementations of the present disclosure.

Exemplarily, FIG. 1C is another schematic structural diagram of a communication system according to implementations of the present disclosure. Referring to FIG. 1C, the communication system includes a terminal device 1201, a satellite 1202, and a base station 1203, where wireless communication may be performed between the terminal device 1201 and the satellite 1202, and communication may be performed between the satellite 1202 and the base station 1203. A network among the terminal device 1201, the satellite 1202, and the base station 1203 may also be referred to as an NTN. In the architecture of the communication system illustrated in FIG. 3C, the satellite 1202 may not have a base-station function, and communication between the terminal device 1201 and the base station 1203 may be realized through relaying of the satellite 1202. In the system architecture, the base station 1203 may be referred to as a network device. Optionally, the communication system may include multiple network devices 1203, and in coverage of each network device 1203, other numbers of terminal devices may be included, which is not limited in the implementation of the present disclosure.

It is to be noted that, FIGS. 1A to 1C merely illustrate, by way of example, systems to which the present disclosure is applicable. Certainly, the method illustrated in the implementations of the present disclosure may also be applicable to other systems, for example, a 5$^{th}$ generation (5G) communication system and a long term evolution (LTE) communication system, which is not specifically limited in the implementations of the present disclosure.

Optionally, the wireless communication systems illustrated in FIG. 1A to FIG. 1C can further include other network entities such as a mobility management entity (MME) and an access and mobility management function (AMF), which is not limited in the implementations of the present disclosure.

Various implementations of the present disclosure are described in conjunction with a network device and a terminal device. The terminal device may also be referred to as a UE, an access terminal, a subscriber unit, a subscriber station, a mobile station, a mobile console, a remote station, a remote terminal, a mobile device, a user terminal, a terminal, a wireless communication device, a user agent, or a user apparatus.

The terminal device may be a station (ST) in a wireless local area network (WLAN), and may be a cellular phone, a cordless phone, a session initiation Protocol (SIP) phone, a wireless local loop (WLL) station, a personal digital assistant (PDA) device, a device having a wireless communication function such as a handheld device, a computing device, other processing device connected to a wireless modem, an in-vehicle device, or a wearable device, or may be a terminal device in a next generation communication system such as a terminal device in an NR network, or a terminal device in a future evolved public land mobile network (PLMN) network.

In the implementations of the present disclosure, the terminal device may be deployed on land, including indoor or outdoor, handheld, wearable, or vehicle-mounted; the terminal device may also be deployed on water (such as a ship), and may also be deployed in the air (such as an airplane, a balloon, and a satellite).

In the implementations of the present disclosure, the terminal device may be a mobile phone, a pad, a computer with wireless receiving and transmitting functions, a terminal device for virtual reality (VR), a terminal device for augmented reality (AR), a wireless terminal in industrial control, a wireless terminal in self driving, a wireless terminal in remote medical, a wireless terminal in smart grid, a wireless terminal device in transportation safety, a wireless terminal in smart city or smart home, or the like.

As an example but not limitation, in the implementations of the present disclosure, the terminal device may be a wearable device. The wearable device can also be called a wearable smart device, which is a collective name of wearable devices intelligently designed and developed by applying a wearable technology to daily wear, such as glasses, gloves, watches, clothing, shoes, etc. The wearable device is a portable device that can be worn directly on the body or integrated into clothing or accessories of a user. The wearable device not only is a hardware device but also can realize powerful functions through software support, data interaction, and cloud interaction. Broadly speaking, the wearable smart device includes a device that has full functions and a large size and can realize all or part of functions without relying on a smart phone, e.g., a smart watch, smart glasses, or the like, and includes a device that only focuses on a certain application function and needs to be used with other devices such as a smart phone, e.g., all kinds of smart bracelets and smart jewelry for physical sign monitoring or the like The network device may further include an access network device and a core network device, that is, the wireless communication system further includes multiple core networks for communication with the access network device. The access network device may be an evolved node B (which may be an eNB or an e-node B for short), a macro base station, a micro base station (also referred to as a "small base station"), a pico base station, an access point (AP), a transmission point (TP) or a new generation node B (gNodeB) in an LTE system, a next generation (new radio, NR) system, or an authorized auxiliary access-LTE (LAA-LTE) system.

In the implementations of the present disclosure, the network device may be a device that can communicate with a mobile device. The network device may be an AP in the WLAN, a base transceiver station (BTS) in a global system for mobile communications (GSM) or code division multiple access (CDMA) system, or a node B (NB) in a wideband code division multiple access (WCDMA) system. Alternatively, the network device may be an evolutional node B (eNB or eNodeB), a relay station, an AP, an in-vehicle device, or a wearable device in the LTE, a network device (generation node B, gNB) in the NR network, a network device in the future evolved PLMN, or a network device in the NTN.

As an example but not limitation, in the implementations of the present disclosure, the network device can have a mobility, e.g., the network device may be a mobile device. Optionally, the network device may be a satellite or a balloon station. For example, the satellite may be an LEO satellite, an MEO satellite, a GEO satellite, an HEO satellite, or the like. Alternatively, the network device may be a base station deployed on land, on water, or on other locations.

In the implementations of the present disclosure, the network device can provide services for a cell, and the terminal device can communicate with the network device through transmission resources (e.g., frequency-domain resources or spectrum resources) for the cell. The cell may be a cell corresponding to the network device (e.g., a base station). The cell may belong to a macro base station or a base station corresponding to a small cell. The small cell may include a metro cell, a micro cell, a pico cell, a femto cell, or the like. These small cells have features of small coverage ranges and low transmission power and are suitable for providing high-speed data transmission services.

It is to be understood that a device having a communication function in the network/system in implementations of the present disclosure may be referred to as a communication device. Taking the communication system(s) described herein as an example, communication devices may include a network device having a communication function and a terminal device having a communication function, where the network device and the terminal device may be specific devices described in the implementations of the present disclosure, and details are not repeated herein. The communication device can further include other devices in the communication system, for example, a network controller, an MME, and other network entities, which are not limited in the implementations of the present disclosure.

The technical solutions of the implementations of the present disclosure may be applied to various communication systems, for example, a GSM system, a CDMA system, a WCDMA system, general packet radio service (GPRS), an LTE system, an advanced long term evolution (LTE-A) system, an NR system, an evolved system of the NR system, an LTE-based access to unlicensed spectrum, (LTE-U) system, and an NR-based access to unlicensed spectrum (NR-U) system, an NTN system, a universal mobile telecommunication system (UMTS), a wireless local area networks (WLAN) system, a wireless fidelity (WiFi) system, a 5G communication system, or other communication system.

Optionally, the implementations of the present disclosure may be applied to an NTN system, and may also be applied to a terrestrial network (TN) system.

The communication system in the implementations of the present disclosure may be applied to a carrier aggregation (CA) scenario, a dual connectivity (DC) scenario, and a standalone (SA) scenario.

Optionally, the communication system in the implementations of the present disclosure can be applied to an unlicensed spectrum, where the unlicensed spectrum can also be considered as a shared spectrum. Alternatively, the communication system in the implementations of the present disclosure may be applied to a licensed spectrum, where the licensed spectrum may be considered as a non-shared spectrum.

It can be understood that, the terms "system" and "network" in the present disclosure are often used interchangeably. The term "and/or" in the present disclosure is simply an illustration of an association relationship of associated objects, indicating that three relationships may exist, for example, A and/or B, which may indicate the existence of A alone, A and B together, and B alone. In addition, the character "/" in the present disclosure generally indicates that associated objects are in an "or" relationship.

It is to be understood that, the "indication" mentioned in the implementations of the present disclosure may be a direct indication, an indirect indication, or an indication indicating an association relation. For example, A indicates B, which may indicate that A directly indicates B, for example, B may be acquired through A. Alternatively, A indicates B, which may indicate that A indirectly indicates B, for example, A indicates C, and B may be acquired through C. Alternatively, A indicates B, which may indicate that there is an association relationship between A and B.

In illustration of the implementations of the present disclosure, the term "correspondence" may represent a direct correspondence or indirect correspondence between the two, may represent an associated relation between the two, or may represent a relation of indicating and being indicated, a relation of configuring and being configured, or other relations.

Optionally, the indication information in the implementations of the present disclosure may include physical layer signaling, for example, at least one of downlink control information (DCI), radio resource control (RRC) signaling, and a medium access control control element (MAC CE).

Optionally, a higher-layer parameter or higher-layer signaling in the implementations of the present disclosure may include at least one of RRC signaling or an MAC CE.

At present, in the 3GPP, two types of satellite network architectures, namely a transparent payload satellite network architecture and a regenerative payload satellite network architecture, are considered.

A satellite network (namely, an NTN) may include the following network elements:

(1) at least one gateway: where the at least one gateway is configured for connection between a satellite and a terrestrial public network;

(2) a feeder link: where the feeder link is configured for communication between a gateway and a satellite;

(3) a service link: where the service link is configured for communication between a terminal device and a satellite;

(4) satellites: the satellites are classified into a transparent payload satellite and a regenerative payload satellite based on functions of the satellites. The transparent payload satellite can only perform radio frequency filtering, frequency conversion and amplification, and can only provide transparent payload of signals, and a waveform signal repeated by the payload is unchanged. The regenerative payload satellite can perform radio frequency filtering, frequency conversion and amplification as well as demodulation/decoding, switch/routing, and encoding/modulation, and have part of or all base station functions;

(5) an inter-star link: the inter-start link is in the regenerative payload network architecture.

Figure 2:
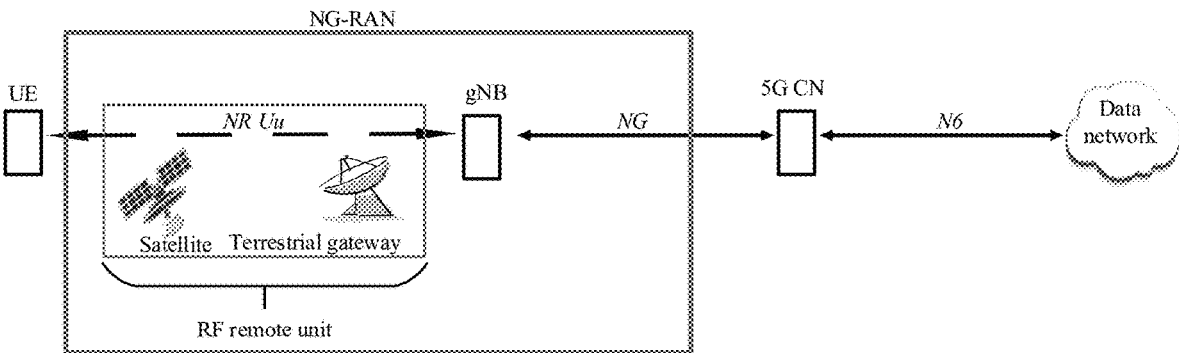
FIG. 2 is a schematic diagram of a transparent payload satellite network architecture according to implementations of the present disclosure.

Exemplarily, FIG. 2 is a schematic diagram of a transparent payload satellite network architecture, including: a 5G access network (NG-RAN) formed by a UE, a base station (gNB), a satellite, and a non-terrestrial gateway (NTN gateway), a 5G core network (5G CN), and a data network. The UE and the gNB are connected via an NR Uu interface (namely, a universal user network interface). The base station and the 5G CN are connected via an NG interface. The 5G core network and the data network are connected via an N6 interface. The satellite and the NTN gateway form a remote radio unit (RRU), data transmission between the UE and the NB may be forwarded by the satellite and the NTN gateway, and in a forwarding process, the satellite and the NTN gateway do not perform protocol stack processing on data, thereby implementing transparent payload.

Figure 3:
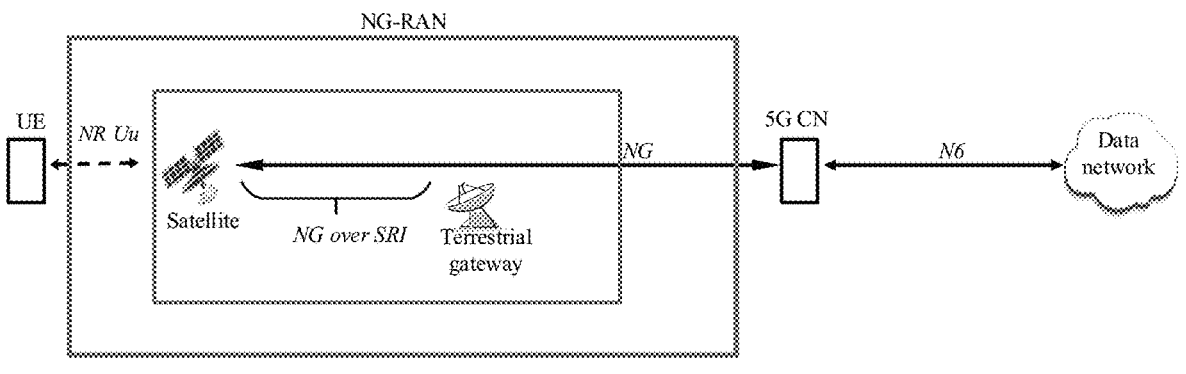
FIG. 3 is a schematic diagram of a regenerative payload satellite network architecture according to implementations of the present disclosure.

Exemplarily, FIG. 3 is a schematic diagram of a regenerative payload satellite network architecture, including an NG-RAN formed by a UE, a satellite, and an NTN gateway, a 5G CN, and a data network. The UE and the satellite are connected via an NR Uu interface, the satellite and the 5G CN are connected via an NG interface, and the 5G CN and the data network are connected via an N6 interface. The satellite and the NTN gateway are connected via an NG interface over a signal rate indicator (SRI) interface (namely, NG over SRI). During data transmission of the UE, data may be forwarded by the satellite, and the satellite may perform protocol stack processing on data in the forwarding process, thereby implementing regenerative payload.

II. Timing Relationships in an NTN System

In a terrestrial communication system, a propagation delay of signal communication is usually less than 1 ms. In the NTN system, since a communication distance between a terminal device and a satellite (or a network device) is very great, a propagation delay of signal communication is much longer, ranging from several milliseconds to hundreds of milliseconds, and is specifically related to a satellite orbital height and a service type of satellite communication. In order to deal with such long propagation delay, the timing relationships in the NTN system needs to be enhanced compared with an NR system.

Similar to the NR system, in the NTN system, a UE needs to consider the influence of a TA during uplink (UL) transmission. Since the propagation delay in the NTN system is relatively large, a TA value is also relatively large. When the UE is scheduled to perform UL transmission in slot n, the UE needs to consider a round trip time (RTT) and performs transmission in advance in UL transmission, so that signals can arrive at a base station side in UL slot n. Specifically, the timing relationships in the NTN system may include two cases, as respectively illustrated in FIGS. 4 and 5 below.

Figure 4:
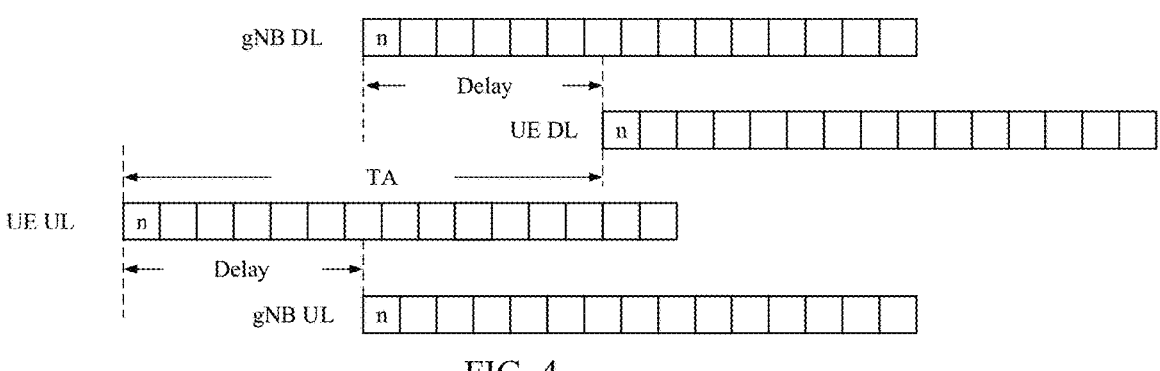
FIG. 4 illustrates timing relationship 1 in a non-terrestrial network (NTN) system according to implementations of the present disclosure.

Case 1 is illustrated in FIG. 4. Similar to the NR system, a downlink (DL) slot and a UL slot of a network device are aligned, but a DL slot and a UL slot of a UE are not aligned. In order to align UL transmission of the UE and the UL slot of the network device, the UE may need to apply a relatively large TA value, for example, a TA value as illustrated in FIG. 4. In UL transmission, the UE needs to apply a relatively large offset. In some cases, the TA value may also be used to determine a $K_{offset}$ value.

It is to be noted that, in the accompanying drawings of the implementations of the present disclosure, a DL slot of the network device or timing corresponding to the DL slot of the network device is represented as gNB DL in the figure. A UL slot of the network device or timing corresponding to the UL slot of the network device is represented as gNB UL in the figure. A DL slot of the UE or timing corresponding to the DL slot of the UE is represented as UE DL in the figure. A UL slot of the UE or timing corresponding to the UL slot of the UE is represented as UE UL in the figure.

Optionally, an offset between a DL slot of the network device and a UL slot of the network device exists.

Figure 5:
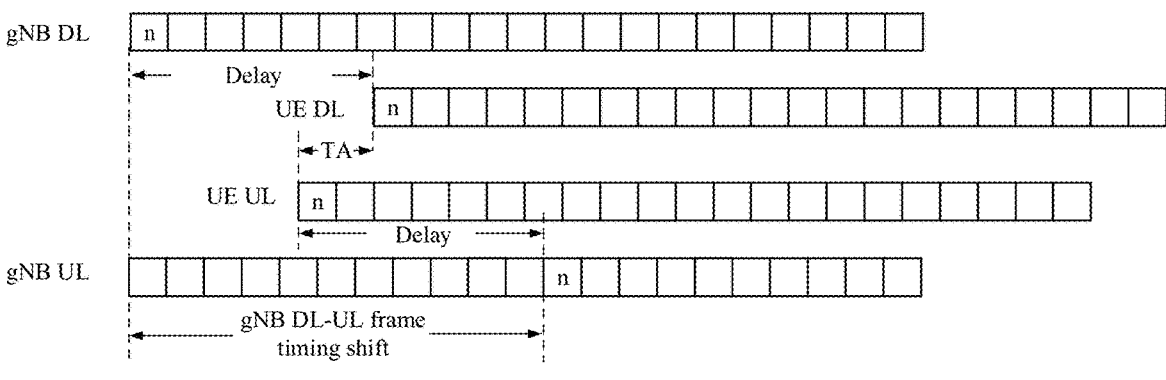
FIG. 5 illustrates timing relationship 2 in an NTN system according to implementations of the present disclosure.

Case 2 is illustrated in FIG. 5. An offset between a DL slot of the network device and a UL slot of the network device exists. In this case, in order to align UL transmission of the UE and the UL slot of the network device, the terminal device needs to apply a relatively small TA value. However, in this case, additional scheduling complexity is needed for the network device to handle corresponding scheduling timing.

III. Timing Relationships in the NR System

The existing timing relationships in the NR system are as follows.

1) Physical downlink shared channel (PDSCH) reception timing: When a UE is scheduled to receive a PDSCH by DCI, the DCI indicates $K_0$, and $K_0$ is used for determining a slot for transmitting the PDSCH. For example, when the scheduling DCI is received in slot n, a slot allocated for transmission of the PDSCH is $$\left\lfloor n \cdot \frac{2^{\mu_{PDSCH}}}{2^{\mu_{PDCCH}}} \right\rfloor + K_0,$$

where $K_0$ is determined based on a subcarrier spacing of the PDSCH, $\mu_{PDSCH}$ and $\mu_{PDCCH}$ are subcarrier spacing configurations for a PDSCH and a physical downlink control channel (PDCCH), respectively. The value of $K_0$ is in the range of 0, . . . , 32.

2. Transmission timing for a physical uplink shared channel (PUSCH) scheduled by DCI: When a UE is scheduled to transmit a PUSCH by DCI, the DCI indicates $K_2$, and $K_2$ is used to determine a slot for transmission of the PUSCH. For example, when the UE receives the scheduling DCI in slot n, a slot allocated for transmission of the PUSCH is $$\left\lfloor n \cdot \frac{2^{\mu_{PUSCH}}}{2^{\mu_{PDCCH}}} \right\rfloor + K_2,$$

where $K_2$ is determined based on a subcarrier spacing of a PDSCH, and $\mu_{PUSCH}$ and $\mu_{PDCCH}$ are subcarrier spacing configurations for a PUSCH and a PDCCH, respectively, and the value of $K_2$ is in the range of 0, . . . , 32.

3) Transmission timing for a PUSCH scheduled by random access response (RAR) grant: With reference to slots for a PUSCH transmission scheduled by a RAR grant, if a UE receives a PDSCH with a RAR grant message ending in slot n for a corresponding physical random access channel (PRACH) transmission from the UE, the UE transmits the PUSCH in slot $n+K_2+\Delta$, where $K_2$ and $\Delta$ are agreed by the protocol.

4) Transmission timing for hybrid automatic repeat request-acknowledgement (HARQ-ACK) on a physical uplink control channel (PUCCH): With reference to slots for PUCCH transmission, for a PDSCH reception ending in slot n or a semi-persistent scheduling (SPS) PDSCH release through a PDCCH reception ending in slot n, a UE provides corresponding HARQ-ACK information in a PUCCH transmission within slot n+K1.

The HARQ-ACK information includes ACK information or NACK information. K1 represents the number of slots and is indicated by a PDSCH-to-HARQ-timing-indicator field in a DCI format, or provided by a HARQ feedback timing set (e.g. dl-DataToUL-ACK). K1=0 corresponds to the last slot of the PUCCH transmission that overlaps with the PDSCH reception or with the PDCCH reception in case of SPS PDSCH release.

5) MAC CE action timing: when HARQ-ACK corresponding to a PDSCH carrying a MAC-CE command is transmitted in slot n, a corresponding action and a UE assumption on the DL configuration indicated by the MAC-CE command shall be applied starting from the first slot that is after slot $$n + 3N_{slot}^{subframe,\mu},$$

where $$N_{slot}^{subframe,\mu}$$

denotes the number of slots per subframe for subcarrier configuration μ.

6) Transmission timing for channel state information (CSI) on a PUSCH: The transmission timing for CSI on a PUSCH follows the general transmission timing for DCI scheduled PUSCH transmission.

7) CSI reference resource timing: A CSI reference resource for a CSI report in UL slot n' is defined by a single DL slot $n-n_{CSI\_ref}$, where $$n = \left\lfloor n' \cdot \frac{2^{\mu_{DL}}}{2^{\mu_{UL}}} \right\rfloor,$$

$\mu_{DL}$ and $\mu_{UL}$ are DL and UL subcarrier spacing configurations, respectively. The value of $n_{CSI\_ref}$ depends on the type of CSI report.

8) Aperiodic sounding reference signal (SRS) transmission timing: if a UE receives a DCI trigging aperiodic SRS in slot n, the UE transmits aperiodic SRS in each of the triggered SRS resource set(s) in slot $$\left\lfloor n \cdot 2^{\frac{\mu_{SRS}}{\mu_{PDCCH}}} \right\rfloor + k,$$

where k is configured via a higher-layer parameter slotOffset for each triggered SRS resource set and is based on a subcarrier spacing of the triggered SRS transmission, and $\mu_{SRS}$ and $\mu_{PDCCH}$ are subcarrier spacing configurations for a triggered SRS and a PDCCH carrying a triggering command, respectively.

IV. Timing Enhancement in the NTN System

PDSCH reception timing in the NR system is only impacted by DL timing, and is not impacted by a large RTT in the NTN system, and thus in the NTN system, the PDSCH reception timing in the NR system can be reused.

The other timing relationships involve DL reception-UL reception interaction, and thus need to be enhanced for normal operation in the NTN system or to overcome a large transmission delay in the NTN system. A simple solution is to introduce an offset $K_{offset}$ into the system and apply the offset $K_{offset}$ to the relevant timing relationships.

(A) Transmission timing of DCI scheduled PUSCH (including CSI on PUSCH): if the scheduling DCI is received in slot n, then a slot allocated for transmission of the PUSCH can be modified to be $$\left\lfloor n\frac{2^{\mu_{PUSCH}}}{2^{\mu_{PDCCH}}}\right\rfloor + K_2 + K_{offset}.$$

(B) Transmission timing of a RAR grant scheduled PUSCH: for a slot for transmission of a RAR grant scheduled PUSCH, the UE transmits the PUSCH in slot $n+K_2+\Delta+K_{offset}$.

(C) Transmission timing of HARQ-ACK on a PUCCH: for a slot for PUCCH transmission, a UE provides corresponding HARQ-ACK information in a PUCCH transmission within slot $n+K_2+\Delta+K_{offset}$.

(D) MAC CE action timing: when HARQ-ACK information corresponding to a PDSCH carrying a MAC-CE command is transmitted in slot n, a corresponding action and a UE assumption on DL configuration indicated by the MAC-CE command shall be applied starting from the first slot that is after $$\text{slot } n + XN_{slot}^{subframe,\mu} + K_{offset},$$

where the value of X may depend on NTN UE capability and may not necessarily be 3.

(E) CSI reference resource timing: a CSI reference resource for a CSI report in slot n' is defined by a single DL slot $n-n_{CSI_{ref}}-K_{offset}$.

(F) Transmission timing of an aperiodic SRS: if the UE receives a DCI triggering aperiodic SRS in slot n, the UE transmits an aperiodic SRS in each of triggered SRS resource set(s) in slot $$\left\lfloor n\cdot 2^{\frac{\mu_{SRS}}{\mu_{PDCCH}}}\right\rfloor + k + K_{offset}.$$

V. Determination of an Initial TA in the NTN

There may be two types of UEs in the NTN, namely, a UE without positioning capabilities and a UE with positioning capabilities.

Figure 6:
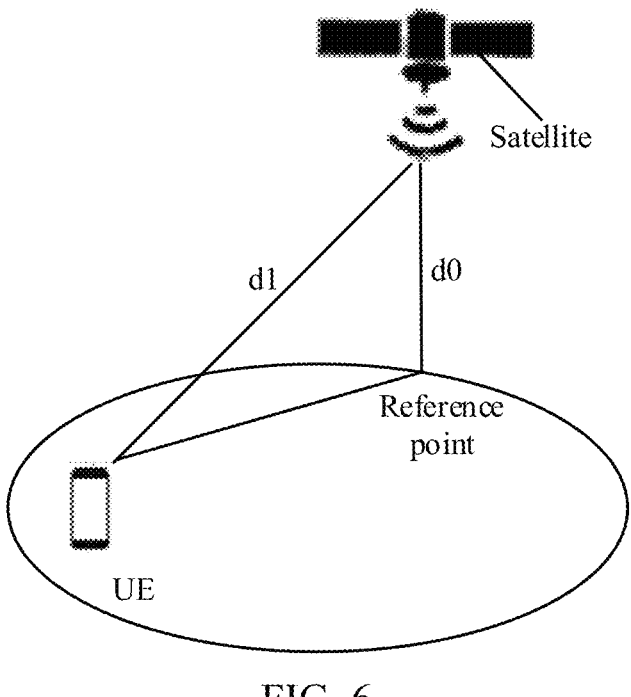
FIG. 6 is a schematic diagram of a regenerative payload NTN architecture according to implementations of the present disclosure.

For the UE without positioning capabilities, a satellite can broadcast a common TA based on a signal propagation delay between a nearby point (namely, a point closet to the satellite in ground coverage of the satellite, i.e. a reference point in FIG. 6) and a base station. FIG. 6 is a schematic diagram of a regenerative payload NTN architecture, where common TA=2*d0/c, d0 represents a distance between the satellite and the nearby point, and dl represents a distance between the satellite and the UE.

Figure 7:
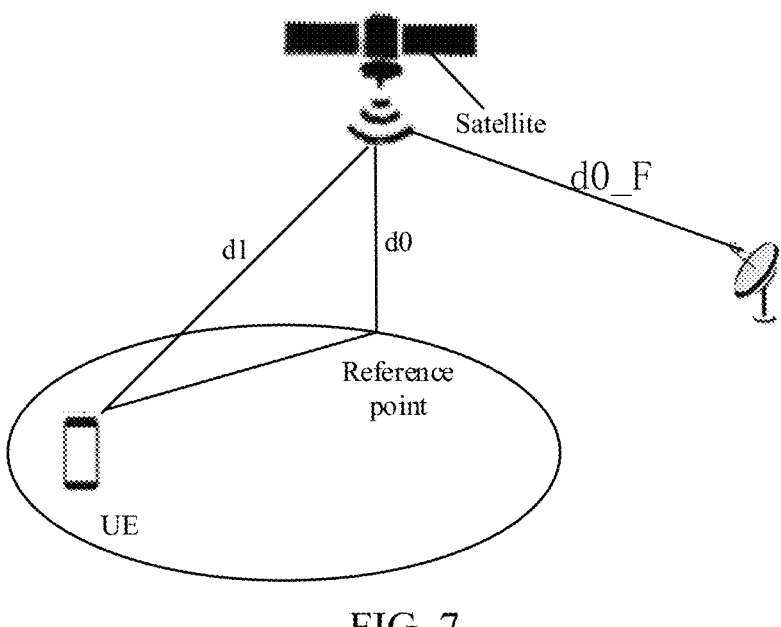
FIG. 7 is a schematic diagram of a transparent payload NTN architecture according to implementations of the present disclosure.

FIG. 7 is a schematic diagram of a transparent payload NTN architecture, where TA=2*(d0+d0_F)/c. The UE performs compensation with the common TA broadcasted by the network device when the UE sends a preamble. The network indicates a UE specific TA to the UE by an RAR, and thus an initial TA of the UE is a sum of the broadcasted common TA and the UE specific TA indicated by the RAR. d0 represents a distance between a satellite and a nearby location (namely, a point closet to the satellite in ground coverage of the satellite, i.e., a reference point in FIG. 7), and d0_F represents a distance between the satellite and a TN, and dl represents a distance between the satellite and a UE.

Based on the current progress of NTN standardization in the 3GPP, for configuration of a $K_{offset}$, the following conclusions have been made. For initial random access (RA), a network may configure a $K_{offset}$ for each cell or a $K_{offset}$ for each satellite beam in a broadcast manner. The network may configure a UE specific $K_{offset}$ for a UE in a connected state via radio resource control (RRC) signaling or MAC. If no UE specific $K_{offset}$ is configured by the network, the UE uses the broadcasted $K_{offset}$.

Based on the current understanding, the network configures the value of the $K_{offset}$ mainly based on a TA, for example, for the $K_{offset}$ broadcasted by the network, the network needs to configured the $K_{offset}$ based on the maximum TA supported by a cell or a satellite beam. For the UE specific $K_{offset}$, the network can configure the $K_{offset}$ based on the TA of the UE.

In addition, for each UE without global navigation satellite system (GNSS) positioning capabilities, the UE needs to perform TA compensation based on the common TA when sending an RA request in an RA procedure. Based on the description in the existing communication protocol TR 38.821, each satellite beam corresponds to at least one ground reference point, that is, at least one common TA needs to be broadcasted for each satellite beam.

For a scenario in which multiple satellite beams are in a cell, a network broadcasts multiple $K_{offset}$ and multiple common TA, and the most intuitive manner is that the network configures one $K_{offset}$ and one common TA for each satellite beam. Since both value ranges of the $K_{offset}$ and the TA are large, configuration of each $K_{offset}$ and each TA may occupy a large number of bits. In such a configuration manner, relatively great signaling overhead may be required. How to reduce signaling overhead for configuration is a problem to be solved.

In order to solve the above problems, the implementations of the present disclosure provide a method for time-domain parameter determination. A network device can send configuration information to a terminal device. The configuration information includes a time-domain-parameter reference value and at least one time-domain-parameter offset value, so that the terminal device can determine a time-domain parameter based on the configuration information. Terminal devices each can determine a corresponding time-domain parameter in a scenario where multiple satellite beams are in a cell or a scenario where a satellite serves multiple terminal devices, so that multiple different time-domain parameters may be configured with a small number of bits. Therefore, in such a configuration manner, signaling overhead can be reduced.

Implementation 1

As illustrated in FIG. 8, implementations of the present disclosure provide a method for time-domain parameter determination. The method includes the following.

In 801, a network device sends configuration information to a terminal device.

The configuration information includes a time-domain-parameter reference value and at least one time-domain-parameter offset value.

Optionally, the time-domain parameter may include the following cases.

Case 1: the time-domain parameter may be a $K_{offset}$.

In case 1, the time-domain-parameter reference value is a $K_{offset}$ reference value, which may be denoted as a $K_{offset}$_ref in the implementation, and the time-domain-parameter offset value is a $K_{offset}$ offset value, and each of the at least one time-domain-parameter offset value may be denoted as a delte $K_{offset}$_i, where 0<=i<N, and N is larger than or equal to 0.

Optionally, in the implementations of the present disclosure, in the case where the time-domain parameter is the $K_{offset}$, determine a time-domain resource location for UL transmission according to the time-domain parameter.

Case 2: the time-domain parameter may be a common TA.

In case 2, the time-domain-parameter reference value is a common TA reference value, which may be denoted as a common TA_ref in the implementation, the time-domain-parameter offset value is a common TA offset value, and each of the at least one time-domain-parameter offset value may be denoted as a delte common TA_i.

Optionally, the at least one time-domain-parameter offset value corresponds to at least one object, and each of the at least one time-domain-parameter offset value corresponds to one or more objects. The at least one object is at least one beam. Alternatively, the at least one object is at least one terminal device.

Optionally, the network device in the implementations of the present disclosure may be a base station or a satellite, and the foregoing beam may refer to a base station beam or a satellite beam. In the implementations of the present disclosure, in the case where the network device is a base station, the forging beam refers to a base station beam, and in the case where the network device is a satellite, the forgoing beam refers to a satellite beam.

Optionally, in the implementations of the present disclosure, in the case where the time-domain parameter is the common TA, perform TA compensation based on the time-domain parameter when sending an RA request in an RA procedure.

Optionally, in the implementations of the present disclosure, in the case where the time-domain parameter is the common TA, the time-domain parameter is applicable to a terminal device without positioning capabilities.

Optionally, the RA procedure includes a 4-step RA procedure and/or a 2-step RA procedure.

A manner in which the network device sends the configuration information may include at least one of the following.

(a) The configuration information (the time-domain-parameter reference value and the at least one time-domain-parameter offset value) is sent in a broadcast manner.

(b) The time-domain-parameter reference value is sent in a broadcast manner.

(c) In the case where the at least one time-domain-parameter offset value corresponds to at least one beam, the at least one time-domain-parameter offset value is sent in a broadcast manner or in a multicast manner.

(d) In the case where the at least one time-domain-parameter offset value corresponds to at least one terminal device, the at least one time-domain-parameter offset value is sent in a multicast manner or via dedicated signaling, where the dedicated signaling may be MAC CE signaling or RRC signaling.

In 802, the terminal device determines the time-domain parameter according to the configuration information.

In case of different configuration information, the operation in 802 may be implemented in different manners, which is specifically described as follows.

(1) An implementation of the configuration information is as follows: the time-domain-parameter reference value is shared by at least one object, and each of the at least one time-domain-parameter offset value corresponds to one object.

With regard to the implementation of the configuration information in section (1) mentioned above, the implementation of the operation in 802 includes determining the time-domain parameter according to the time-domain-parameter reference value and a first time-domain-parameter offset value. The first time-domain-parameter offset value is one of the at least one time-domain-parameter offset value. The first time-domain-parameter offset value corresponds to a beam where the terminal device is located, or the first time-domain-parameter offset value corresponds to the terminal device.

Optionally, determining the time-domain parameter according to the time-domain-parameter reference value and the first time-domain-parameter offset value includes obtaining the time-domain parameter by calculating a sum of the time-domain-parameter reference value and the first time-domain-parameter offset value.

Optionally, determining the time-domain parameter according to the time-domain-parameter reference value and the first time-domain-parameter offset value includes obtaining the time-domain parameter by calculating a difference between the time-domain-parameter reference value and the first time-domain-parameter offset value.

Optionally, for a transparent payload NTN architecture, the time-domain-parameter reference value is determined according to a first RTT and a second RTT. The first RTT is an RTT between a first reference point and the network device, and an UL time domain and a DL time domain of the first reference point are aligned. The second RTT is an RTT between the network device and a ground reference point in a cell coverage area where the terminal device is located. The network device is an NTN device serving the terminal device.

Optionally, the time-domain-parameter reference value is a sum of the first RTT and the second RTT.

Optionally, for a regenerative payload NTN architecture, the time-domain-parameter reference value is a second RTT, where the second RTT is an RTT between the network device and a ground reference point in a cell coverage area where the terminal device is located, and the network device is an NTN device serving the terminal device.

(2) Another implementation of the configuration information is as follows: the time-domain-parameter reference value is a time-domain parameter corresponding to a first object, and each of the at least one time-domain-parameter offset value is an offset value of a time-domain parameter corresponding to each of at least one other object relative to the time-domain-parameter reference value, where the at least one other object is an object except for the first object among all objects.

In the implementation, all the objects refer to all beams of the satellite, or all the objects refer to all beams served by the satellite.

With regard to the implementation of the configuration information in section (2) mentioned above, an implementation of the operation in 802 includes determining the time-domain-parameter reference value as the time-domain parameter when the terminal device corresponds to the first object.

The terminal device corresponding to the first object may include that the terminal device is a first terminal device, or the terminal device is located in a first beam.

Optionally, the time-domain-parameter reference value is a time-domain parameter corresponding to a first terminal device. In this case, when the terminal device is determined to be the first terminal device, it can be determined that the time-domain-parameter reference value is the time-domain parameter.

Optionally, the time-domain-parameter reference value is a time-domain parameter corresponding to a first beam. In this case, when the terminal device is determined to be located in the first beam, it can be determined that the time-domain-parameter reference value is the time-domain parameter.

With regard to the implementation of the configuration information in section (2) mentioned above, another implementation of the operation at 802 includes determining the time-domain parameter according to the time-domain-parameter reference value and a first time-domain-parameter offset value when the terminal device corresponds to a second object. The first time-domain-parameter offset value is one of the at least one time-domain-parameter offset value, the first time-domain-parameter offset value corresponds to a satellite beam where the terminal device is located, or the first time-domain-parameter offset value corresponds to the terminal device. The second object is one of the at least one other object.

Optionally, the time-domain-parameter reference value is a time-domain parameter corresponding to the first terminal device. In this case, when it is determined that the terminal device is a second terminal device, it needs to determine the time-domain parameter according to the time-domain-parameter reference value and a first time-domain-parameter offset value. In this case, the first time-domain-parameter offset value is a time-domain-parameter offset value corresponding to the second terminal device.

Optionally, the time-domain-parameter reference value is a time-domain parameter corresponding to the first beam. In this case, when it is determined that the terminal device is located in a second beam, it needs to determine the time-domain parameter according to the time-domain-parameter reference value and a first time-domain-parameter offset value. In this case, the first time-domain-parameter offset value is a time-domain-parameter offset value corresponding to the second beam.

In the method for time-domain parameter determination provided in the implementations of the present disclosure, the network device can send the configuration information to the terminal device, where the configuration information includes the time-domain-parameter reference value and the at least one time-domain-parameter offset value, so that the terminal device can determine the time-domain parameter according to the configuration information. Terminal devices each can determine a corresponding time-domain parameter in a scenario where multiple satellite beams are in a cell or a scenario where a satellite serves multiple terminal devices. In this way, multiple different time-domain parameters may be configured with a small number of bits. Therefore, in such a configuration manner, signaling overhead can be reduced.

In order to more clearly illustrate the method for time-domain parameter determination provided in the implementations of the present disclosure, the following will illustrate the implementations of the present disclosure based on a case where the at least one time-domain-parameter offset value correspond to at least one satellite beam (relating to Implementation 2 to Implementation 5 below) and a case where the at least one time-domain-parameter offset value correspond to at least one terminal device (relating to Implementation 6 to Implementation 9 below).

Implementation 2

A manner of configuring a $K_{offset}$ for each satellite beam is as follows. The network device configures a $K_{offset}$ reference value, which is denoted as a $K_{offset}$_ref, and configures a delte $K_{offset}$_i for each satellite beam i. In this case, a $K_{offset}$ corresponding to satellite beam i is a sum of the $K_{offset}$_ref and the delte $K_{offset}$_i. The specific implementation is as follows.

First, the network device configures a $K_{offset}$ for each satellite beam, where the $K_{offset}$ is used to determine a time-domain resource location for UL transmission of a UE. A manner in which the network device configures the $K_{offset}$ is as follows.

a) Configure a time-domain-parameter reference value for the $K_{offset}$, which is denoted as a $K_{offset}$_ref. For example, for the transparent payload NTN architecture, the $K_{offset}$_ref is a sum of an RTT between a first reference point and a serving satellite and an RTT between the serving satellite and a ground reference point (in a cell ground coverage area). A UL slot (UL timing) and a DL slot (DL timing) of the first reference point are aligned. For the regenerative payload NTN architecture, the $K_{offset}$_ref is an RTT between the serving satellite and a ground reference point (in a cell ground coverage area).

b) Configure a time-domain-parameter offset value i for each satellite beam i, which is denoted as a delte $K_{offset}$_i. The delte $K_{offset}$_i represents an increment of the $K_{offset}$ corresponding to satellite beam i relative to the $K_{offset}$_ref. i is greater than or equal to 0, i is less than N, N represents the number of satellite beams in a cell, and beam indexes are 0, 1, 2, . . . , N−1.

Then, the terminal device uses, based on the configuration configured by the network device, a $K_{offset}$ corresponding to a satellite beam where the terminal device is located. That is, in the case where the terminal device is located in satellite beam i and no specific $K_{offset}$ is configured for the terminal device by the network device, a $K_{offset}$ used by the terminal device is the sum of the $K_{offset}$_ref and the delte $K_{offset}$_i.

Exemplarily, assuming that there are 3 satellite beams in a cell where the terminal device is currently located, table 1 below illustrates configuration of a $K_{offset}$ for each satellite beam. The network device may configure in a broadcast manner: a time-domain-parameter reference value $K_{offset}$_ref, a time-domain-parameter offset value delte $K_{offset}$_0 for satellite beam 0, a time-domain-parameter offset value delte $K_{offset}$_1 for satellite beam 1, and a time-domain-parameter offset value delte $K_{offset}$_2 for satellite beam 2. Accordingly, in the case where the terminal device is located in satellite beam 0, a $K_{offset}$ corresponding to the terminal device located in satellite beam 0 is determined to be a $K_{offset}$_0 corresponding to satellite beam 0, where $K_{offset}$_0=$K_{offset}$_ref+delte $K_{offset}$_0; in the case where the terminal device is located in satellite beam 1, a $K_{offset}$ corresponding to the terminal device located in satellite beam 1 is determined to be a $K_{offset}$_1 corresponding to satellite beam 1, where $K_{offset}$_1=$K_{offset}$_ref+delte $K_{offset}$_1; in the case where the terminal device is located in satellite beam 2, a $K_{offset}$ corresponding to the terminal device located in satellite beam 2 is determined to be a $K_{offset}$_2 corresponding to satellite beam 2, where $K_{offset}$_2=$K_{offset}$_ref+delte $K_{offset}$_2.

TABLE 1

| Time-domain-parameter reference value | Time-domain-parameter offset value | Time-domain parameter $K_{offset}$ |
|---|---|---|
| $K_{offset}$_ref | For satellite beam 0, delte $K_{offset}$_0 | $K_{offset}$_0 = $K_{offset}$_ref + delte $K_{offset}$_0 |
|  | For satellite beam 1, delte $K_{offset}$_1 | $K_{offset}$_1 = $K_{offset}$_ref + delte $K_{offset}$_1 |
|  | For satellite beam 2, delte $K_{offset}$_2 | $K_{offset}$_2 = $K_{offset}$_ref + delte $K_{offset}$_2 |

Implementation 3

A manner of configuring a $K_{offset}$ for each satellite beam is as follows. The network device configures a $K_{offset}\_0$ for satellite beam 0, and configures a delte $K_{offset}\_i$ for each satellite beam i (i>0). In this case, a $K_{offset}$ corresponding to satellite beam i is a sum of the $K_{offset}\_0$ and the delte $K_{offset}\_i$.

The specific implementation is as follows. First, the network device configures a $K_{offset}$ for each satellite beam, where the $K_{offset}$ is used to determine a time-domain resource location for UL transmission of the terminal device. A manner in which the network device configures the $K_{offset}$ is as follows.

a) Configure a $K_{offset}$ for satellite beam 0, which is denoted as $K_{offset}\_0$.
  b) Configure a $K_{offset}$ offset value for each satellite beam i, which is denoted as the delte $K_{offset}\_i$. The delte $K_{offset}\_i$ represents an increment of the $K_{offset}$ corresponding to satellite beam i relative to the $K_{offset}\_0$. 0<i<N, and N represents the number of satellite beams in a cell.

Then, the terminal device uses, based on the configuration configured by the network device, a $K_{offset}$ corresponding to a satellite beam where the terminal device is located. That is, in the case where the terminal device is located in satellite beam i and no specific $K_{offset}$ is configured for the terminal device by the network device, a $K_{offset}$ used by the terminal device is as follows. a) In the case where the terminal device is located in beam 0, the $K_{offset}$ used by the terminal device is $K_{offset}\_0$ broadcasted by the network device. b) Otherwise, in the case where the terminal device is located in beam i (i is not equal to 0), the $K_{offset}$ used by the terminal device is the sum of the $K_{offset}\_0$ and the delte $K_{offset}\_i$.

Exemplarily, assuming that there are 3 satellite beams in a cell where the terminal device is currently located, table 2 below illustrates configuration of a $K_{offset}$ for each satellite beam. The network device may configure in a broadcast manner: a time-domain parameter $K_{offset}\_0$ for satellite beam 0, a time-domain-parameter offset value delte $K_{offset}\_1$ for satellite beam 1, and a time-domain-parameter offset value delte $K_{offset}\_2$ for satellite beam 2. Accordingly, in the case where the terminal device is located in satellite beam 0, a $K_{offset}$ corresponding to the terminal device located in satellite beam 0 is determined to be a $K_{offset}\_0$ corresponding to satellite beam 0; in the case where the terminal device is located in satellite beam 1, a $K_{offset}$ corresponding to the terminal device located in satellite beam 1 is determined to be a $K_{offset}\_1$ corresponding to satellite beam 1, where $K_{offset}\_1=K_{offset}\_0+$delte $K_{offset}\_1$; in the case where the terminal device is located in satellite beam 2, a $K_{offset}$ corresponding to the terminal device located in satellite beam 2 is determined to be a $K_{offset}\_2$ corresponding to satellite beam 2, where $K_{offset}\_2=K_{offset}\_0+$delte $K_{offset}\_2$.

TABLE 2

| Time-domain-parameter reference value | Time-domain-parameter offset value | Time-domain parameter $K_{offset}$ |
|---|---|---|
| $K_{offset}\_0$ (time-domain parameter corresponding to satellite beam 0) | Null For satellite beam 1, delte $K_{offset}\_1$ For satellite beam 2, delte $K_{offset}\_2$ | $K_{offset}\_0$ $K_{offset}\_1 = K_{offset}\_0 +$ delte $K_{offset}\_1$ $K_{offset}\_2 = K_{offset}\_0 +$ delte $K_{offset}\_2$ |

Implementation 4

A manner of configuring a common TA for each satellite beam is as follows. The network device configures a common TA reference value, which is denoted as a common TA_ref, and configures a delta common TA_i for each satellite beam i. In this case, a common TA corresponding to satellite beam i is a sum of the common TA_ref and the delta common TA_i.

The specific implementation is as follows. Firstly, the network device configures a common TA for each satellite beam, and the common TA is used for a terminal device without positioning capabilities to perform TA compensation when sending msg1 in an RA procedure (i.e., 4-step RA)/sending msgA in an RA procedure (i.e., 2-step RA). A manner in which the network device configures the common TA is as follows.

a) Configure the common TA reference value, which is denoted as the common TA_ref. For example, for the transparent payload NTN architecture, the common TA_ref is a sum of an RTT between a first reference point and a serving satellite and an RTT between the serving satellite and a ground reference point (in a cell ground coverage area). UL timing and DL timing of the first reference point are aligned. For the regenerative payload NTN architecture, the common TA_ref is an RTT between a serving satellite and a ground reference point (in a cell ground coverage area).
  c) Configure a common TA offset value for each satellite beam i, which is denoted as the delta common TA_i, where the delta common TA_i represents an increment of the common TA corresponding to satellite beam i relative to the common TA_ref. i is greater than or equal to 0, i<N, and N represents the number of satellite beams in a cell.

Then, for a terminal device without positioning capabilities, when the terminal device initiates an RA procedure, the terminal device uses, based on the configuration configured by the network device, a common TA corresponding to a satellite beam where the terminal device is located. That is, in the case where the terminal device is located in satellite beam i and there is no valid available TA for the terminal device at current time, the terminal device sends msg1/msg3 by using the common TA corresponding to satellite beam i. The common TA corresponding to satellite beam i is a sum of the common TA_ref and the delta common TA_i.

Exemplarily, assuming that there are 3 satellite beams in a cell where the terminal device is currently located, table 3 below illustrates configuration of a common TA for each satellite beam. The network device may configure in a broadcast manner: a time-domain-parameter reference value common TA_ref, a time-domain-parameter offset value delta common TA_0 for satellite beam 0, a time-domain-parameter offset value delta common TA_1 for satellite beam 1, and a time-domain-parameter offset value delta common TA_2 for satellite beam 2. Accordingly, in the case where the terminal device is located in satellite beam 0, a common TA corresponding to the terminal device in satellite beam 0 is determined to be a common TA_0 corresponding to satellite beam 0, where common TA_0=common TA_ref+delta common TA_0; in the case where the terminal device is located in satellite beam 1, a common TA corresponding to the terminal device located in satellite beam 1 is determined to be a common TA_1 corresponding to satellite beam 1, where common TA_1=common TA_ref+delta common TA_1; in the case where the terminal device is located in satellite beam 2, a common TA corresponding to the terminal device in satellite beam 2 is determined to be a common TA_2 corresponding to satellite beam 2, where common
TA_2=common TA_ref+delta common TA_2.

TABLE 3

| Time-domain-parameter reference-value | Time-domain-parameter offset value | Time-domain common TA |
|---|---|---|
| common TA_ref | For satellite beam 0, delta common TA_0 | common TA_0 = common TA_ref + delta common TA_0 |
| | For satellite beam 1, delta common TA_1 | common TA_1 = common TA_ref + delta common TA_1 |
| | For satellite beam 2, delta common TA_2 | common TA_2 = common TA_ref + delta common TA_2 |

Implementation 5

A manner of configuring a common TA for each satellite
beam is as follows. The network device configures a common TA for satellite beam 0, which is denoted as a common
TA_0, and configures a delta common TA_i for each satellite
beam i (where i>0). In this case, a common TA corresponding to satellite beam i is a sum of the common TA_0 and the
delta common TA_i.

The specific implementation is as follows. Firstly, the
network device configures a common TA for each satellite
beam, and the common TA is used for a terminal device
without positioning capabilities to perform TA compensation when sending msg1 in an RA procedure (i.e., 4-step
RA)/sending msgA in an RA procedure (i.e., 2-step RA). A
manner in which the network device configures the common
TA is as follows.

a) Configure a common TA for satellite beam 0, which is
denoted as a common TA_0.

b) Configure a common TA offset value for each satellite
beam i, which is denoted as a delta common TA_i,
where the delta common TA_i represents an increment
of the common TA corresponding to satellite beam i
relative to the common TA_0, where 0<i<N, and N
represents the number of satellite beams in a cell.

Then, for a terminal device without positioning capabilities, when the terminal device initiates an RA procedure, the
terminal device uses, based on the configuration configured
by the network device, a common TA corresponding to a
satellite beam where the terminal device is located. That is,
in the case where the terminal device is located in satellite
beam i and the terminal device has no valid available TA at
current time, the terminal device can send msg1/msg3 by
using the common TA corresponding to satellite beam i. The
common TA corresponding to satellite beam i is as follows.
a) In the case where i=0, the common TA_0 is used. b)
Otherwise, the sum of the common TA_0 and the delta
common TA_i is used.

Exemplarily, assuming that there are 3 satellite beams in
a cell where the terminal device is currently located, table 2
below illustrates configuration of a common TA for each
satellite beam. The network device can configure in a
broadcast manner: a time-domain parameter common TA_0
for satellite beam 0, a time-domain-parameter offset value
delta common TA_1 for satellite beam 1, and a time-domain-
parameter offset value delta common TA_2 for satellite
beam 2. Accordingly, in the case where the terminal device
is located in satellite beam 0, a common TA corresponding
to the terminal device in satellite beam 0 is determined to be
the common TA_0 corresponding to satellite beam 0; in the
case where the terminal device is located in satellite beam 1, a common TA corresponding to the terminal device located
in satellite beam 1 is determined to be a common TA_1
corresponding to satellite beam 1, where common
TA_1=common TA_0+delta common TA_1; in the case
where the terminal device is located in satellite beam 2, a
common TA corresponding to the terminal device located in
satellite beam 2 is determined to be a common TA_2
corresponding to satellite beam 2, where common
TA_2=common TA_0+delta common TA_2.

TABLE 4

| Time-domain-parameter reference value | Time-domain-parameter offset value | Time-domain parameter common TA |
|---|---|---|
| Common TA_0 (time-domain parameter corresponding to satellite beam 0) | Null | common TA_0 |
| | For satellite beam 1, delta common TA_1 | common TA_1 = common TA_0 + delta common TA_1 |
| | For satellite beam 2, delta common TA_2 | common TA_2 = common TA_0 + delta common TA_2 |

Implementation 6

A manner of configuring a $K_{offset}$ for each terminal device
is as follows. The network device configures a $K_{offset}$ reference value which is denoted as a $K_{offset}$_ref, and configures
a delte $K_{offset}$_i for each terminal device i. In this case, a
$K_{offset}$ corresponding to terminal device i is a sum of the
$K_{offset}$_ref and the delte $K_{offset}$_i.

The specific implementation is as follows. First, the
network device configures a $K_{offset}$ for each terminal device,
and the $K_{offset}$ is used to determine a time-domain resource
location for UL transmission of a UE. A manner in which the
network device configures the $K_{offset}$ is as follows.

d) Configure a time-domain-parameter reference value for
the $K_{offset}$, which is denoted as a $K_{offset}$_ref. For
example, for the transparent payload NTN architecture,
the $K_{offset}$_ref is a sum of an RTT between a first
reference point and a serving satellite and an RTT
between the serving satellite and a ground reference
point (in a cell ground coverage area). A UL slot (UL
timing) and a DL slot (DL timing) of the first reference
point are aligned. For the regenerative payload NTN
architecture, the $K_{offset}$_ref is an RTT between a serving
satellite and a ground reference point (in a cell ground
coverage area).

e), Configure a time-domain-parameter offset value for
each terminal device i, which is denoted as a delte
$K_{offset}$_i, where the delte $K_{offset}$_i represents an increment of the $K_{offset}$ corresponding to terminal device i
relative to the $K_{offset}$_ref. i is greater than or equal to 0,
i<N, and N represents the number of terminal devices
in a cell.

Then, the terminal device uses the $K_{offset}$ corresponding to
the current terminal device based on the configuration
configured by the network device. That is, in the case where
the current terminal device is terminal device i and the
network device does not configure a specific $K_{offset}$ for the
current terminal device, a $K_{offset}$ used by the terminal device
is the sum of the $K_{offset}$_ref and the delte $K_{offset}$_i.

Exemplarily, assuming that a satellite serves three terminal devices, table 5 below illustrates configuration of a
$K_{offset}$ for each terminal device. The network device can
configure in a broadcast manner: a time-domain-parameter
reference value $K_{offset}$_ref, a time-domain-parameter offset
value delte $K_{offset}$_0 for terminal device 0, a time-domain-
parameter offset value delte $K_{offset}$_1 for terminal device 1, and a time-domain-parameter offset value delte $K_{offset}\_2$ for terminal device 2. Accordingly, in the case where the current terminal device is terminal device 0, a $K_{offset}$ corresponding to the current terminal device is a $K_{offset}\_0$ corresponding to terminal device 0, where $K_{offset}\_0=K_{offset}\_ref+delte$ $K_{offset}\_0$; in the case where the current terminal device is terminal device 1, the $K_{offset}$ corresponding to the current terminal device is a $K_{offset}\_1$ corresponding to terminal device 1, where $K_{offset}\_1=K_{offset}\_ref+delte\ K_{offset}\_1$; in the case where the current terminal device is terminal device 2, the $K_{offset}$ corresponding to the current terminal device is a $K_{offset}\_2$ corresponding to terminal device 2, where $K_{offset}\_2=K_{offset}\_ref+delte\ K_{offset}\_2$.

TABLE 5

| Time-domain-parameter reference value | Time-domain-parameter offset value | Time-domain $K_{offset}$ |
| --- | --- | --- |
| $K_{offset}\_ref$ | For terminal device 0, delte $K_{offset}\_0$<br>For terminal device 1, delte $K_{offset}\_1$<br>For terminal device 2, delte $K_{offset}\_2$ | $K_{offset}\_0 = K_{offset}\_ref +$ delte $K_{offset}\_0$<br>$K_{offset}\_1 = K_{offset}\_ref +$ delte $K_{offset}\_1$<br>$K_{offset}\_2 = K_{offset}\_ref +$ delte $K_{offset}\_2$ |

Implementation 7

A manner of configuring a $K_{offset}$ for each terminal device is as follows. The network device configures a time-domain parameter $K_{offset}$ for terminal device 0, which is denoted as a $K_{offset}\_0$, and configures a delte $K_{offset}\_i$ for each terminal device i (where i>0), so that a $K_{offset}$ corresponding to terminal device i is a sum of the $K_{offset}\_0$ and the delte $K_{offset}\_i$.

The specific implementation is as follows. Firstly, the network device configures a $K_{offset}$ for each terminal device, and the $K_{offset}$ is used to determine a time-domain resource location for UL transmission of the terminal device. A manner in which the network device configures the $K_{offset}$ is as follows.

a) Configure the $K_{offset}$ for terminal device 0, which is denoted as the $K_{offset}\_0$.

b) Configure a $K_{offset}$ offset value for each terminal device i, which is denoted as delte $K_{offset}\_i$, where the delte $K_{offset}\_i$ represents an increment of the $K_{offset}$ corresponding to terminal device i relative to the $K_{offset}\_0$. 0<i<N, and N represents the number of terminal devices in a cell.

Then, the terminal device uses the $K_{offset}$ corresponding to the terminal device based on the configuration configured by the network device, i.e., in the case where the current terminal device is terminal device i and the network device does not configure a specific $K_{offset}$ for the terminal device, a $K_{offset}$ used by the terminal device is as follows. c) In the case where the current terminal device is terminal device 0, the $K_{offset}$ used by the current terminal device is the $K_{offset}\_0$ broadcasted by the network device. d) Otherwise, in the case where the current terminal device is terminal device i (i is not equal to 0), the $K_{offset}$ used by the current terminal device is a sum of the $K_{offset}\_0$ and the delte $K_{offset}\_i$.

Exemplarily, assuming that there are 3 terminal devices in a cell where the current terminal device is located, table 6 below illustrates configuration of a $K_{offset}$ for each terminal device. The network device can configure in a broadcast manner: a time-domain parameter $K_{offset}\_0$ for terminal device 0, a time-domain-parameter offset value delte $K_{offset}\_1$ for terminal device 1, and a time-domain-parameter offset value delte $K_{offset}\_2$ for terminal device 2. Accordingly, in the case where the current terminal device is terminal device 0, a $K_{offset}$ corresponding to the current terminal device is determined to be the $K_{offset}\_0$ corresponding to terminal device 0; in the case where the current terminal device is terminal device 1, the $K_{offset}$ corresponding to the current terminal device is determined to be a $K_{offset}\_1$ corresponding to terminal device 1, where $K_{offset}\_1=K_{offset}\_0+delte\ K_{offset}\_1$; in the case where the current terminal device is terminal device 2, the $K_{offset}$ corresponding to the current terminal device is determined to be a $K_{offset}\_2$ corresponding to terminal device 2, where $K_{offset}\_2=K_{offset}\_0+delte\ K_{offset}\_2$.

TABLE 6

| Time-domain-parameter reference value | Time-domain-parameter offset value | Time-domain parameter $K_{offset}$ |
| --- | --- | --- |
| $K_{offset}\_0$ (time-domain parameter corresponding to terminal device 0) | Null<br>For terminal device 1, delte $K_{offset}\_1$<br>For terminal device 2, delte $K_{offset}\_2$ | $K_{offset}\_0$<br>$K_{offset}\_1 = K_{offset}\_0 +$ delte $K_{offset}\_1$<br>$K_{offset}\_2 = K_{offset}\_0 +$ delte $K_{offset}\_2$ |

Implementation 8

A manner of configuring a common TA for each terminal device is as follows.

The network device configures a common TA reference value which is denoted as a common TA_ref, and configures a delta common TA_i for each terminal device i. In this case, a common TA for terminal device i is a sum of the common TA_ref and the delta common TA_i.

The specific implementation process is as follows. Firstly, the network device configures a common TA for each terminal device, and the common TA is used for a terminal device without positioning capabilities to perform TA compensation when sending msg1 in a RA procedure (i.e, 4-step RA)/sending msgA in a RA procedure (2-step RA). A manner in which the network device configures the common TA is as follows.

b) Configure a common TA reference value, which is denoted as common TA_ref. For example, for the transparent payload NTN architecture, the common TA_ref is a sum of an RTT between a first reference point and a serving satellite and an RTT between the serving satellite and a ground reference point (in a cell ground coverage area). UL timing and DL timing of the first reference point are aligned. For the regenerative payload NTN architecture, the common TA_ref is an RTT between a serving satellite and a ground reference point (in a cell ground coverage area).

c) Configure a common TA offset value for each terminal device i, which is denoted as a delta common TA_i, where the delta common TA_i represents an increment of the common TA for terminal device i relative to the common TA_ref.

Then, for a terminal device without positioning capabilities, when the terminal device initiates an RA procedure, the terminal device uses a common TA corresponding to the terminal device based on the configuration configured by the network device. That is, in the case where the terminal device is terminal device i and the terminal device has no valid available TA at current time, the terminal device can send msg1/msg3 by using the common TA corresponding to terminal device i. The common TA corresponding to terminal device i is the sum of the common TA_ref and the delta common TA_i.

Exemplarily, assuming that there are 3 terminal devices in a cell where the current terminal device is located, table 7 below illustrates configuration of a common TA for each terminal device. The network device can configure in a broadcast manner: a time-domain-parameter reference value common TA_ref, a time-domain-parameter offset value delta common TA_0 for terminal device 0, a time-domain-parameter offset value delta common TA_1 for terminal device 1, and a time-domain-parameter offset value delta common TA_2 for terminal device 2. Accordingly, in the case where the current terminal device is terminal device 0, a common TA corresponding to the current terminal device is determined to be a common TA_0 corresponding to terminal device 0, where common TA_0=TA_ref+delta common TA 0; in the case where the current terminal device is terminal device 1, the common TA corresponding to the current terminal device is determined to be a common TA_1 corresponding to terminal device 1, where common TA_1=common TA_ref+delta common TA_1; in the case where the current terminal device is terminal device 2, the common TA corresponding to the current terminal device is determined to be a common TA_2 corresponding to terminal device 2, where common TA_2=common TA_ref+delta common TA_2.

TABLE 7

| Time-parameter reference value | Time-domain-parameter offset value | Time-domain parameter common TA |
|---|---|---|
| common TA_ref | For terminal device 0, delta common TA_0 | common TA_0 = common TA_ref + delta common TA_0 |
| | For terminal device 1, delta common TA_1 | common TA_1 = common TA_ref + delta common TA_1 |
| | For terminal device 1, delta common TA_2 | common TA_2 = common TA_ref + delta common TA_2 |

Implementation

A manner for configuring a common TA for each terminal device is as follows.

The network device configures a common TA for terminal device 0, which is denoted as a command TA_0, and configures a delta command TA_i for each terminal device i (where i>0). In this case, a common TA corresponding to terminal device i is a sum of the common TA_0 and the delta command TA_i.

The specific implementation process is as follows. Firstly, the network device configures a common TA for each terminal device, and the common TA is used for the terminal device without positioning capabilities to perform TA compensation when sending msg1in an RA procedure (namely, 4-step RA procedure)/sending msgA in an RA procedure (namely, 2-step RA procedure). A manner in which the network device configures the common TA is as follows.

c) Configure a common TA for terminal device 0, which is denoted as common TA_0.

d) Configure a common TA offset value for each terminal device i, which is denoted as a delta common TA_i, where the delta common TA_i represents an increment of the common TA corresponding to terminal device i relative to the common TA_0. 0<i<N, and N represents the number of terminal devices in a cell.

Then, for a terminal device without positioning capabilities, when the terminal device initiates an RA procedure, the terminal device uses a common TA corresponding to the terminal device based on the configuration configured by the network device. That is, in the case where the current terminal device is terminal device i and the current terminal device has no valid available TA at current time, the terminal device can send msg1/msg3 by using the common TA corresponding to terminal device i. The common TA corresponding to terminal device i is as follows. c) If i=0, the common TA_0 is used. d) Otherwise, the sum of the common TA_0 and the delta common TA_i is used.

Exemplarily, assuming that there are three terminal devices in a cell where the current terminal device is located, table 8 below illustrates configuring of a common TA for each terminal device. The network device can configure in a broadcast manner: a time-domain parameter common TA_0 for terminal device 0, a time-domain-parameter offset value delta common TA_1 for terminal device 1, and a time-domain-parameter offset value delta common TA_2 for terminal device 2. Accordingly, in the case where the current terminal device is terminal device 0, a common TA corresponding to the current terminal device is determined to be the common TA_0 corresponding to terminal device 0; in the case where the current terminal device is terminal device 1, the common TA corresponding to the current terminal device is determined to be a common TA_1 corresponding to terminal device 1, where common TA_1=common TA_0+delta common TA_1; in the case where the terminal device is terminal device 2, the common TA corresponding to the current terminal device is determined to be a common TA_2 corresponding to terminal device 2, where common TA_2=common TA_0+delta common TA_2.

TABLE 8

| Time-domain-parameter reference value | Time-domain-parameter offset value | Time-domain parameter common TA |
|---|---|---|
| common TA_0 (time-domain parameter corresponding to terminal device 0) | Null | common TA_0 |
| | for terminal device 1, delta common TA_1 | common TA_1 = common TA_0 + delta common TA_1 |
| | for terminal device 2, delta common TA_2 | common TA_2 = common TA_0 + delta common TA_2 |

The configuration manner in the implementations of the present disclosure can be applicable to a scenario where there are multiple satellite beams in a cell or a scenario where the satellite serves multiple terminal devices. In such a configuration manner, multiple different time-domain parameters can be configured with a small number of bits, thereby reducing signaling overhead.

As illustrated in FIG. 9, a terminal device is provided. The terminal device includes a receiving module 901 configured to receive configuration information sent by a network device, and a processing module 902 configured to determine a time-domain parameter according to the configuration information, where the configuration information includes a time-domain-parameter reference value and at least one time-domain parameter offset value.

Optionally, the at least one time-domain-parameter offset value corresponds to at least one object, and each of the at least one time-domain-parameter offset value corresponds to one or more objects. The at least one object is at least one beam, or the at least one object is at least one terminal device.

Optionally, the time-domain-parameter reference value is shared by the at least one object. Each of the at least one time-domain-parameter offset value corresponds to one object.

Optionally, the processing module 902 is configured to determine the time-domain parameter according to the time-domain-parameter reference value and a first time-domain parameter offset value. The first time-domain-parameter offset value is one of the at least one time-domain-parameter offset value. The first time-domain-parameter offset value corresponds to a beam where the terminal device is located, or the first time-domain-parameter offset value corresponds to the terminal device.

Optionally, for a transparent payload NTN architecture, the time-domain-parameter reference value is determined according to a first RTT and a second RTT. The first RTT is an RTT between a first reference point and the network device, and a UL time domain and a DL time domain of the first reference point are aligned. The second RTT is an RTT between the network device and a ground reference point in a cell coverage area where the terminal device is located. The network device is an NTN device serving the terminal device.

Optionally, the time-domain-parameter reference value is a sum of the first RTT and the second RTT.

Optionally, for a regenerative payload NTN architecture, the time-domain-parameter reference value is a second RTT, where the second RTT is an RTT between the network device and a ground reference point in a cell coverage area where the terminal device is located, and the network device is an NTN device serving the terminal device.

Optionally, the time-domain-parameter reference value is a time-domain parameter corresponding to the first object. Each of the at least one time-domain-parameter offset value is an offset value of a time-domain parameter corresponding to each of at least one other object relative to the time-domain-parameter reference value, and each of the at least one other object is an object except for the first object among all objects.

Optionally, the processing module 902 is configured to determine the time-domain-parameter reference value as the time-domain parameter when the terminal device corresponds to the first object.

Optionally, the processing module 902 is configured to determine the time-domain parameter according to the time-domain-parameter reference value and a first time-domain-parameter offset value when the terminal device corresponds to a second object. The first time-domain-parameter offset value is one of the at least one time-domain-parameter offset value. The first time-domain-parameter offset value corresponds to a satellite beam where the terminal device is located, or the first time-domain-parameter offset value corresponds to the terminal device. The second object is one of at least one other object.

Optionally, the processing module 902 is configured to obtain the time-domain parameter by calculating a sum of the time-domain-parameter reference value and the first time-domain-parameter offset value.

Optionally, the time-domain parameter is a slot offset $K_{offset}$.

Optionally, the time-domain parameter is a common TA.

Optionally, the processing module 902 is further configured to determine, after determining the time-domain parameter according to the configuration information and when the time-domain parameter is the $K_{offset}$, a time-domain resource location for UL transmission according to the time-domain parameter; or to perform, after determining the time-domain parameter according to the configuration information and when the time-domain parameter is the common TA, TA compensation according to the time-domain parameter when sending an RA request in an RA procedure.

Optionally, the time-domain parameter is applied to a terminal device without positioning capabilities when the time-domain parameter is the common TA.

Optionally, the RA procedure includes a 4-step RA procedure and/or a 2-step RA procedure.

Optionally, the time-domain-parameter reference value is sent in a broadcast manner.

Optionally, the at least one time-domain-parameter offset value is sent in a broadcast manner or a multicast manner when the at least one time-domain-parameter offset value corresponds to at least one beam.

Optionally, the at least one time-domain-parameter offset value is sent in a multicast manner or through dedicated signaling when the at least one time-domain-parameter offset value corresponds to at least one terminal device.

Optionally, the network device is a satellite.

As illustrated in FIG. 10, a network device is provided. The network device includes a sending module 1001 configured to send configuration information to a terminal device, where the configuration information is used for determining a time-domain parameter, and the configuration information includes a time-domain-parameter reference value and at least one time-domain-parameter offset value.

Optionally, the at least one time-domain-parameter offset value corresponds to at least one object, and each of the at least time-domain-parameter offset value corresponds to one or more objects. The at least one object is at least one beam, or the at least one object is at least one terminal device.

Optionally, the time-domain-parameter reference value corresponds to each object. Each of the at least one time-domain-parameter offset value corresponds to one object.

Optionally, for a transparent payload NTN architecture, the time-domain-parameter reference value is determined according to a first RTT and a second RTT. The first RTT is an RTT between a first reference point and the network device, and a UL time domain and a DL time domain of the first reference point are aligned. The second RTT is an RTT between the network device and a ground reference point in a cell coverage area where the terminal device is located. The network device is an NTN device serving the terminal device.

Optionally, the time-domain-parameter reference value is a sum of the first RTT and the second RTT.

Optionally, for a regenerative payload NTN architecture, the time-domain-parameter reference value is a second RTT, where the second RTT is an RTT between the network device and a ground reference point in a cell coverage area where the terminal device is located, and the network device is an NTN device serving the terminal device.

Optionally, the time-domain parameter is a slot offset $K_{offset}$, or the time-domain parameter is a TA.

Optionally, the time-domain-parameter reference value is sent in a broadcast manner.

Optionally, the at least one time-domain-parameter offset value is sent in a broadcast manner or a multicast manner when the at least one time-domain-parameter offset value corresponds to at least one beam. The at least one time-domain-parameter offset value is sent in a multicast manner or through dedicated signaling when the at least one time-domain-parameter offset value corresponds to at least one terminal device.

Optionally, the network device is a satellite.

Implementations of the present disclosure further provide a terminal device. The terminal device includes a memory storing executable program codes, and a processor coupled to the memory. The processor is configured to invoke the executable program code stored in the memory to execute the method for time-domain parameter determination executed by the terminal device in the implementations of the present disclosure.

Implementations of the present disclosure further provide a network device. The network device includes a memory storing executable program codes, and a processor coupled to the memory. The processor is configured to invoke the executable program codes stored in the memory to execute the method for time-domain parameter determination executed by the network device in the implementations of the present disclosure.

Figure 11:
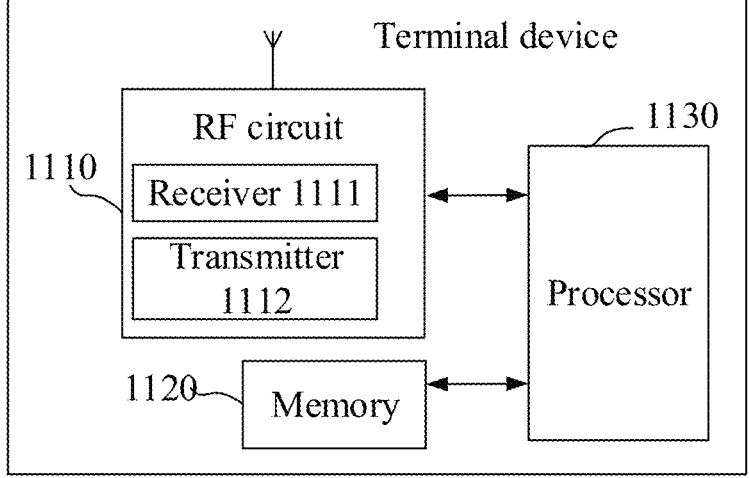
FIG. 11 is a schematic hardware structural diagram of a terminal device according to implementations of the present disclosure.

Exemplarily, FIG. 11 illustrates a terminal device provided in implementations of the present disclosure. The terminal device includes a radio frequency (RF) circuit 1110, a memory 1120, a processor 1130, and other components. The RF circuit 1110 includes a receiver 1111 and a transmitter 1112. Persons skilled in the art understand that the structure of the terminal device illustrated in FIG. 11 does not construct a limitation on the terminal device, and may include more or fewer components than those illustrated in the figure, or a combination of some components, or a different component arrangement.

The RF circuit 1110 can be configured to receive and send information, or receive and transmit signal during a call, and in particular, receive DL information from a base station and then send the DL information to the processor 1130 for processing. In addition, the RF circuit 1110 is configured to send UL data to the base station. Generally, the RF circuit 1110 includes, but is not limited to, an antenna, at least one amplifier, a transceiver, a coupler, a low noise amplifier (LNA), a duplexer, and the like. In addition, the RF circuit 1110 may communicate with other devices via wireless communication and networks, and the wireless communication may employ any communication standard or protocol, including, but not limited to, GSM, GPRS, CDMA, WCDMA, LTE, e-mail, short messaging service (SMS), and the like.

The memory 1120 can be configured to store software programs and modules, and the processor 1130 can be configured to execute various functional applications and data processing of the terminal device by running the software programs and modules stored in the memory 1120. The memory 1120 may mainly include a program storage area and a data storage area, where the program storage area may store an operating system, an application program required for at least one function (such as a sound playback function, an image playback function, etc.). The data storage area stores data created according to use of the terminal device (such as audio data, phonebook, etc.), etc. In addition, the memory 1120 may include a high-speed random access memory (RAM), and may also include a non-volatile memory, such as at least one magnetic disk storage device, a flash memory, or other volatile solid-state storage devices.

The processor 1130 is a control center, connects various parts of the terminal device with various interfaces and lines, and is configured to execute various functions and data processing of the terminal device by running or executing software programs and/or modules stored in the memory 1120 and invoking data stored in the memory 1120, so as to monitor the whole terminal device. Optionally, the processor 1130 may include one or more processing units. Preferably, the processor 1130 may be integrated with an application processor and a modem processor, where the application processor mainly handles an operating system, a user interface, and an application program, etc., and the modem processor mainly handles wireless communications. It can be understood that, the foregoing modem processor may not be integrated into the processor 1130.

In the implementations of the present disclosure, the RF circuit 1110 (may be specifically the receiver 1111) is configured to receive configuration information sent by a network device. The processor 1130 is configured to determine a time-domain parameter according to the configuration information, where the configuration information includes a time-domain-parameter reference value and at least one time-domain-parameter offset value.

Optionally, the at least one time-domain-parameter offset value corresponds to at least one object, and each of the at least one time-domain-parameter offset value corresponds to one or more objects. The at least one object is at least one beam, or the at least one object is at least one terminal device.

Optionally, the time-domain-parameter reference value is shared by the at least one object. Each of the at least one time-domain-parameter offset value corresponds to one object.

Optionally, the processor 1130 is configured to determine the time-domain parameter according to the time-domain-parameter reference value and a first time-domain parameter deviation value. The first time-domain-parameter offset value is one of the at least one time-domain-parameter offset value. The first time-domain-parameter offset value corresponds to a beam where the terminal device is located, or the first time-domain-parameter offset value corresponds to the terminal device.

Optionally, for a transparent payload NTN architecture, the time-domain-parameter reference value is determined according to a first RTT and a second RTT. The first RTT is an RTT between a first reference point and the network device, and a UL time domain and a DL time domain of the first reference point are aligned. The second RTT is an RTT between the network device and a ground reference point in a cell coverage area where the terminal device is located. The network device is an NTN device serving the terminal device.

Optionally, the time-domain-parameter reference value is a sum of the first RTT and the second RTT.

Optionally, for a regenerative payload NTN architecture, the time-domain-parameter reference value is a second RTT, where the second RTT is an RTT between the network device and a ground reference point in a cell coverage area where the terminal device is located, and the network device is an NTN device serving the terminal device.

Optionally, the time-domain-parameter reference value is a time-domain parameter corresponding to the first object. Each of the at least one time-domain-parameter offset value is an offset value of a time-domain parameter corresponding to each of at least one other object relative to the time-domain-parameter reference value, where each of the at least one other object is an object except for the first object among all objects.

Optionally, the processor 1130 is configured to determine the time-domain-parameter reference value as the time-domain parameter when the terminal device corresponds to the first object.

Optionally, the processor 1130 is configured to determine the time-domain parameter according to the time-domain-parameter reference value and a first time-domain-parameter offset value when the terminal device corresponds to a second object. The first time-domain-parameter offset value is one of the at least one time-domain-parameter offset value. The first time-domain-parameter offset value corresponds to a satellite beam where the terminal device is located, or the first time-domain-parameter offset value corresponds to the terminal device. The second object is one of at least one other object.

Optionally, the processor 1130 is configured to obtain the time-domain parameter by calculating a sum of the time-domain-parameter reference value and the first time-domain-parameter offset value.

Optionally, the time-domain parameter is a slot offset $K_{offset}$.

Optionally, the time-domain parameter is a common TA.

Optionally, the processor 1130 is further configured to determine, after determining the time-domain parameter according to the configuration information and when the time-domain parameter is the $K_{offset}$, a time-domain resource location for UL transmission according to the time-domain parameter; or to perform, after determining the time-domain parameter according to the configuration information and when the time-domain parameter is the common TA, TA compensation according to the time-domain parameter when sending an RA request in an RA procedure.

Optionally, the time-domain parameter is applied to a terminal device without positioning capabilities when the time-domain parameter is the common TA.

Optionally, the RA procedure includes a 4-step RA procedure and/or a 2-step RA procedure.

Optionally, the time-domain-parameter reference value is sent in a broadcast manner.

Optionally, the at least one time-domain-parameter offset value is sent in a broadcast manner or a multicast manner when the at least one time-domain-parameter offset value corresponds to at least one beam.

Optionally, the at least one time-domain-parameter offset value is sent in a multicast manner or through dedicated signaling when the at least one time-domain-parameter offset value corresponds to at least one terminal device.

Optionally, the network device is a satellite.

Figure 12:
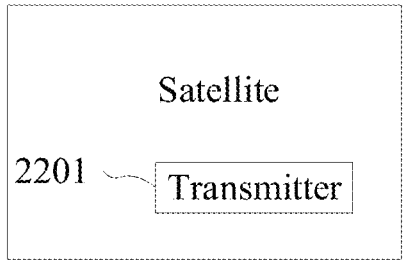
FIG. 12 is a schematic hardware structural diagram of a satellite according to implementations of the present disclosure.

Exemplarily, as illustrated in FIG. 12, a network device in the implementations of the present disclosure may be a satellite. The satellite includes a transmitter 2201 configured to send configuration information to a terminal device, where the configuration information is used for determining a time-domain parameter, and the configuration information includes a time-domain-parameter reference value and at least one time-domain-parameter offset value.

Optionally, the at least one time-domain-parameter offset value corresponds to at least one object, and each of the at least time-domain-parameter offset value corresponds to one or more objects. The at least one object is at least one beam, or the at least one object is at least one terminal device.

Optionally, the time-domain-parameter reference value corresponds to each object. Each of the at least one time-domain-parameter offset value corresponds to one object.

Optionally, for a transparent payload NTN architecture, the time-domain-parameter reference value is determined according to a first RTT and a second RTT. The first RTT is an RTT between a first reference point and the network device, and a UL time domain and a DL time domain of the first reference point are aligned. The second RTT is an RTT between the network device and a ground reference point in a cell coverage area where the terminal device is located. The network device is an NTN device serving the terminal device.

Optionally, the time-domain-parameter reference value is a sum of the first RTT and the second RTT.

Optionally, for a regenerative payload NTN architecture, the time-domain-parameter reference value is a second RTT, where the second RTT is an RTT between the network device and a ground reference point in a cell coverage area where the terminal device is located, and the network device is an NTN device serving the terminal device.

Optionally, the time-domain parameter is a slot offset $K_{offset}$, or the time-domain parameter is a TA.

Optionally, the time-domain-parameter reference value is sent in a broadcast manner.

Optionally, the at least one time-domain-parameter offset value is sent in a broadcast manner or a multicast manner when the at least one time-domain-parameter offset value corresponds to at least one beam. The at least one time-domain-parameter offset value is sent in a multicast manner or through dedicated signaling when the at least one time-domain-parameter offset value corresponds to at least one terminal device.

Implementations of the present disclosure also provide a computer-readable storage medium including computer instructions. The computer instructions, when run on a computer, cause a computer to execute various processes of the terminal device in the foregoing method implementations.

Implementations of the present disclosure also provide a computer-readable storage medium including computer instructions. The computer instructions, when run on a computer, cause a computer to execute various processes of the network device in the foregoing method implementations.

Implementations of the present disclosure also provide a computer program product including computer instructions. When the computer program product runs on a computer, the computer runs the computer instructions, so that the computer executes various processes of the terminal device in the forgoing method implementations.

Implementations of the present disclosure also provide a computer program product including computer instructions. When the computer program product runs on a computer, the computer runs the computer instructions, so that the computer executes various processes of the network device in the forgoing method implementations.

Implementations of the present disclosure also provide a chip. The chip is coupled to a memory in a terminal device, and the chip is configured to call program instructions stored in the memory during operation, to enable the terminal device to execute various processes of the terminal device in the forgoing method implementations.

Implementations of the present disclosure also provide a chip. The chip is coupled to a memory in a network device, and the chip is configured to call program instructions stored in the memory during operation, to enable the network device to execute various processes of the network device in the forgoing method implementations.

All or part of the above implementations can be implemented through software, hardware, firmware, or any other combination thereof. When implemented by software, all or part of the above implementations can be implemented in the form of a computer program product. The computer program product includes one or more computer instructions. When the computer instructions are loaded and executed on a computer, all or part of the operations or functions of the implementations of the disclosure are performed. The computer may be a general-purpose computer, a special-purpose computer, a computer network, or other programmable apparatuses. The computer instruction may be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fibre, a digital subscriber line (DSL), etc. The wireless manner can be, for example, infrared, wireless, microwave, etc. The computer-readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

The terms "first", "second", "third", "fourth" and the like used in the specification, the claims, and the accompany drawings of the implementations of the present disclosure are used to distinguish similar objects rather than describe a particular order. It is to be understood that data so used are interchangeable under appropriate circumstances, such that the implementations of the disclosure described herein can be practiced in sequences other than those illustrated or described herein. In addition, the terms "include", "comprise", and "have" as well as variations thereof are intended to cover non-exclusive inclusion. For example, a process, method, system, product, or device including a series of steps or units is not necessarily limited to those steps or units explicitly listed, but may include steps or units not explicitly listed or inherent to the process, method, product, or device.

What is claimed is:

1. A method for time-domain parameter determination, the method being executed by a terminal device and comprising:

receiving configuration information sent by a network device, the configuration information comprising a time-domain-parameter reference value and at least one time-domain-parameter offset value; and determining a time-domain parameter according to the configuration information;

wherein determining the time-domain parameter according to the configuration information comprises:

determining the time-domain-parameter reference value as the time-domain parameter when the terminal device corresponds to a first object, wherein the first object is configured with the time-domain-parameter reference value; or determining the time-domain parameter according to the time-domain-parameter reference value and a first time-domain-parameter offset value when the terminal device corresponds to a second object, wherein the second object is configured with the time-domain-parameter reference value and the first time-domain-parameter offset value.

2. The method of claim 1, wherein:

the time-domain-parameter reference value is a time-domain parameter corresponding to the first object; and each of the at least one time-domain-parameter offset value is an offset value of a time-domain parameter corresponding to each of at least one other object relative to the time-domain-parameter reference value, wherein each of the at least one other object is an object except for the first object among all objects;

wherein the first time-domain-parameter offset value is one of the at least one time-domain-parameter offset value, the first time-domain-parameter offset value corresponds to a satellite beam where the terminal device is located or corresponds to the terminal device, and the second object is one of the at least one other object.

3. The method of claim 1, wherein:

the time-domain parameter is a slot offset $K_{offset}$; or the time-domain parameter is a common timing advance (TA).

4. The method of claim 3, wherein after determining the time-domain parameter according to the configuration information, the method further comprises:

determining a time-domain resource location for UL transmission according to the time-domain parameter when the time-domain parameter is the $K_{offset}$; or performing TA compensation according to the time-domain parameter when sending a random access (RA) request in an RA procedure, when the time-domain parameter is the common TA.

5. The method of claim 4, wherein the time-domain parameter is applied to a terminal device without positioning capabilities when the time-domain parameter is the common TA.

6. The method of claim 4, wherein the RA procedure comprises a 4-step RA procedure a 2-step RA procedure.

7. The method of claim 1, wherein the time-domain-parameter reference value is sent in a broadcast manner.

8. The method of claim 1, wherein the at least one time-domain-parameter offset value is sent in a broadcast manner or a multicast manner when the at least one time-domain-parameter offset value corresponds to at least one beam.

9. The method of claim 1, wherein the at least one time-domain-parameter offset value is sent in a multicast manner or through dedicated signaling when the at least one time-domain-parameter offset value corresponds to at least one terminal device.

10. A terminal device, comprising:

a transceiver;

a processor coupled to the transceiver; and a memory configured to store a computer program;

wherein executing the computer program by the processor causes the terminal device to:

receive configuration information sent by a network device; and determine a time-domain parameter according to the configuration information, the configuration information comprising a time-domain-parameter reference value and at least one time-domain-parameter offset value;

wherein executing the computer program by the processor causing the terminal device to determine the time-domain parameter according to the configuration information causes the terminal device to:

determine the time-domain-parameter reference value as the time-domain parameter when the terminal device corresponds to a first object, wherein the first object is configured with the time-domain-parameter reference value; or determine the time-domain parameter according to the time-domain-parameter reference value and a first time-domain-parameter offset value when the terminal device corresponds to a second object, wherein the second object is configured with the time-domain-parameter reference value and the first time-domain-parameter offset value.

11. The terminal device of claim 10, wherein:

the time-domain-parameter reference value is a time-domain parameter corresponding to the first object; and each of the at least one time-domain-parameter offset value is an offset value of a time-domain parameter corresponding to each of at least one other object relative to the time-domain-parameter reference value, wherein each of the at least one other object is an object except for the first object among all objects;

wherein the first time-domain-parameter offset value is one of the at least one time-domain-parameter offset value, the first time-domain-parameter offset value corresponds to a satellite beam where the terminal device is located or corresponds to the terminal device, and the second object is one of the at least one other object.

12. A network device, comprising:

a transceiver;

a processor coupled to the transceiver; and a memory configured to store a computer program;

wherein executing the computer program by the processor causes the network device to:

send configuration information to a terminal device, the configuration information being used for determining a time-domain parameter, and the configuration information comprising a time-domain-parameter reference value and at least one time-domain-parameter offset value;

wherein the time-domain-parameter reference value is determined as the time-domain parameter when the terminal device corresponds to a first object, wherein the first object is configured with the time-domain-parameter reference value; or wherein the time-domain parameter is determined according to the time-domain-parameter reference value and a first time-domain-parameter offset value when the terminal device corresponds to a second object, wherein the second object is configured with the time-domain-parameter reference value and the first time-domain-parameter offset value.

13. The network device of claim 12, wherein:

the time-domain parameter is a slot offset $K_{offset}$; or the time-domain parameter is a timing advance (TA).

14. The network device of claim 12, wherein the time-domain-parameter reference value is sent in a broadcast manner.

15. The network device of claim 12, wherein the at least one time-domain-parameter offset value is sent in a broadcast manner or a multicast manner when the at least one time-domain-parameter offset value corresponds to at least one beam.

16. The network device of claim 12, wherein the at least one time-domain-parameter offset value is sent in a multicast manner or through dedicated signaling when the at least one time-domain-parameter offset value corresponds to at least one terminal device.

17. The network device of claim 12, wherein:

the time-domain-parameter reference value is a time-domain parameter corresponding to the first object; and each of the at least one time-domain-parameter offset value is an offset value of a time-domain parameter corresponding to each of at least one other object relative to the time-domain-parameter reference value, wherein each of the at least one other object is an object except for the first object among all objects;

wherein the first time-domain-parameter offset value is one of the at least one time-domain-parameter offset value, the first time-domain-parameter offset value corresponds to a satellite beam where the terminal device is located or corresponds to the terminal device, and the second object is one of the at least one other object.

* * * * *